US007324665B2

(12) United States Patent
Rohály

(10) Patent No.: US 7,324,665 B2
(45) Date of Patent: Jan. 29, 2008

(54) METHOD OF MULTI-RESOLUTION ADAPTIVE CORRELATION PROCESSING

(75) Inventor: János Rohály, Bedford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 687 days.

(21) Appl. No.: 10/662,257

(22) Filed: Sep. 15, 2003

(65) Prior Publication Data

US 2004/0062420 A1    Apr. 1, 2004

Related U.S. Application Data

(60) Provisional application No. 60/411,211, filed on Sep. 16, 2002.

(51) Int. Cl.
  *G06K 9/00* (2006.01)
(52) U.S. Cl. ............. 382/107; 382/124; 382/141; 382/278; 382/302
(58) Field of Classification Search .......... 382/107, 382/124, 141, 278, 302
  See application file for complete search history.

(56) References Cited

U.S. PATENT DOCUMENTS

| | | | | |
|---|---|---|---|---|
| 4,729,109 A | * | 3/1988 | Adrian et al. | 356/28 |
| 5,249,238 A | * | 9/1993 | Komerath et al. | 382/107 |
| 5,491,642 A | * | 2/1996 | Wormell et al. | 702/49 |
| 5,850,485 A | * | 12/1998 | Hart | 382/278 |
| 6,077,226 A | * | 6/2000 | Washburn et al. | 600/443 |
| 6,097,477 A | * | 8/2000 | Sarrafzadeh-Khoee | 356/35.5 |
| 6,108,458 A | | 8/2000 | Hart | |
| 2005/0018882 A1 | * | 1/2005 | Muste et al. | 382/107 |

OTHER PUBLICATIONS

Complimentary Measurement of Geophysical Deformation using Repeat-Pass SAR, Werner et al, School of Georgraphy, University of Leeds, UK, University of Wales, Swansea, UK, IEEE 2001.*
An Image-Based Technique For Low Velocity Free-surface Flows, Jorg Schine, Leipzig University, Jul. 4, 2002.*
J. Rohaly and F. Frigerio, Reverse Hierarchical PIV Processing, 4th International Symposium on Particle Image Velocimetry, Gottingen, Germany, Sep. 17-19, 2001.
Vassilis Seferidis, Mohammed Ghanbari, General Approach to Block-Matching Motion Estimation, Jul. 1993, pp. 1464-1474.
Rohaly, J. et al. Monocular 3-D active μ-PTV. 4$^{th}$ International Symposium on Particle Image Velocimetry. Sep. 17-19, 2001. Paper 1147.

* cited by examiner

*Primary Examiner*—Samir Ahmed
*Assistant Examiner*—Nancy Bitar
(74) *Attorney, Agent, or Firm*—Wolf, Greenfield & Sacks, P.C.

(57) ABSTRACT

A method of multi-resolution adaptive correlation processing of images, such as seeded fluid flow images, to efficiently increase the spatial resolution and dynamic range of detecting particle image displacements in the images. The technique takes full advantage of the multi-resolution characteristic of the discrete correlation function by starting the processing at the smallest scale and if necessary gradually building correlation planes into larger interrogation areas based on the result of inter-level correlation correction and validation. It is shown that the method can be implemented in both direct and FFT based correlation algorithms with greatly reduced computational complexity. Processing the images at the lowest scale (e.g. pixel or particle image size) allows the combination of correlation planes of various shapes both in space and in time for maximizing the correlation plane signal-to-noise ratio or for estimating statistical flow parameters.

9 Claims, 16 Drawing Sheets

Original Image Frame

Interrogation Areas on Uniform Mesh

Combining Interrogation Areas based on Signal Content

VJS PIV STANDARD IMAGE #23: 3D JET IMPINGEMENT/DENSE PARTICLE
First Image Frame

VJS PIV STANDARD IMAGE #23: 3D JET IMPINGEMENT/DENSE PARTICLE
Overlaid 1st and 2nd Image Frames Vector Field on a Regular Mesh Distribution of Interrogation Area Size

**HIGH REYNOLDS NUMBER SWIRLING
FLOW UNDERGOING SUDDEN EXPANSION**
First Image Frame

**HIGH REYNOLDS NUMBER SWIRLING
FLOW UNDERGOING SUDDEN EXPANSION**
Overlaid 1st and 2nd Image Frames

METHOD OF MULTI-RESOLUTION ADAPTIVE CORRELATION PROCESSING

CROSS REFERENCE TO RELATED APPLICATIONS

The present application claims the benefit of U.S. Provisional Application No. 60/411,211, filed on Sep. 16, 2002, entitled, Multi-Resolution Adaptive Correlation Processing, which is hereby incorporated by reference in its entirety.

STATEMENT REGARDING FEDERALLY SPONSORED RESEARCH

Not Applicable.

FIELD OF THE INVENTION

The present invention relates generally to spatial and temporal image processing and, more particularly, to Particle Image Velocimetry (PIV) processing technique.

BACKGROUND OF THE INVENTION

As is known, increasing the spatial resolution together with the dynamic range of PIV measurements is one of the goals of recent efforts in PIV development. One way to achieve high spatial resolution without limiting the dynamic range is to apply a hybrid processing algorithm including sub-image correlation followed by particle tracking. Such methods aim to circumvent problems of conventional block correlation that are expressed by the well-known one-quarter rule of selecting interrogation area size relative to the largest measurable displacement. However, correlation has the potential to resolve particle movement at a much smaller scale than indicated by the above constraint if it is used in a hierarchical coarse-to-fine algorithm. Resolving the particle movement at a relatively small scale involves reducing the interrogation area size in several steps iteratively starting from a coarse spatial resolution where high signal-to-noise ratio ensures high probability of valid correlation peak detection.

One conventional hierarchical processing algorithm is commonly referred to as a Laplacian pyramid processing algorithm, which is widely used in computer vision for multi-resolution image processing and analysis. The main feature of this algorithm is that it resolves larger and smaller scales of fluid motion, for example, at different levels of the processing based on sub-sampled band-limited images. The multi-resolution feature of such an algorithm allows fast processing as well as increased spatial resolution.

Other coarse-to-fine processing algorithms are commonly referred to as a recursive local-correlation, which provides increased spatial resolution by recursively correlating the image frames at finer and finer mesh sizes down to the size of an individual particle image. Correlation search length is also reduced iteratively to the smallest meaningful scale parallel with the decrease of interrogation area size. This process in connection with the sparse array image correlation that is applied directly in the spatial domain makes this processing faster than its Fast Fourier Transform (FFT) based equivalent at usual flow and imaging parameters.

While these algorithms are may work, they are not generally computationally efficient considering that correlation values for certain pixels are repeatedly calculated along with refining the mesh of computation. Furthermore, there is no efficient way to set the spatial resolution for the top level of the hierarchy for the above-described hierarchical processing algorithms. It is likely that different flow regions of a hierarchical image of a fluid under test require different initial interrogation area sizes that ensure valid detection when no prior knowledge of the flow field is available.

Another drawback of the above-described hierarchical processing algorithms relates to when the bottom level of the hierarchical image of the fluid under test contains strongly inhomogeneous flow regions. Interrogation areas at this smallest scale might not contain enough particle images, particularly in sparsely seeded flow areas (e.g. vortex core, flow separation region etc.) to obtain valid information. In addition to these shortcomings, optimizing interrogation areas with respect to their signal content becomes difficult due to the top-to-bottom processing path.

Furthermore, current temporal estimates of statistical flow parameters may be too restrictive in terms of highest resolvable spatial scale due to the need of recovering instantaneous flow velocities from image pairs, or strongly biased due to improper combination of correlation data, for example by ensemble averaging correlation planes.

It would, therefore, be desirable to overcome the aforesaid and other disadvantages.

SUMMARY OF THE INVENTION

The present invention provides a method of detecting relative displacement of pixel values defined in an image array of pixel values as a function of time by combining pixel information from discrete block correlation and using various signal peak detection methods, for example, correlation based-correction (CBC) or False Correlation Symmetry (FCS), to validate the block correlation with respect to noise. Further, the method of the present invention takes advantage of these validations and uses them in an efficient method of reverse hierarchical processing of the image. The method of reverse hierarchical processing of the image starts processing of the image at the smallest meaningful scale (e.g., pixel resolution or image size of a characteristic feature) and locally steps up to the next level of pixel resolution if a valid image correlation cannot be determined, which significantly reduces processing time. With this arrangement, a user can efficiently estimate relative displacement of pixel values, which are defined in an image array of pixel values, over a predetermined time interval. While the invention is primarily shown and described in conjunction with processing an image of an automobile, as well as seeded fluid flow images, it should be understood that the invention is applicable to many other images and image flows, such as machine process images, traffic images, as well as a plurality of other images of objects, in which a determination as to the relative displacement of particles, objects and/or portions of the images is desirable In one aspect of the invention, a method is provided for processing at least first and second images of an image flow of an object to determine a relative displacement of elements of the image flow over a predetermined time interval. The method includes recording a first array of pixel values associated with the first image of the image flow. The method also includes recording a second array of pixel values associated with the second image of the image flow. A first plurality of interrogation regions is defined on each of the first and second arrays of pixel values of the image flow. Each of the first plurality of interrogation regions includes a first minimal pixel resolution. A first interrogation region from each of the first plurality of interrogation regions located on each of the first and second arrays of pixel values is processed to provide a first correlation plane including a first plurality of signal values. A first predetermined signal value is detected from the first plurality of signal values associated with the first correlation plane. Thereafter, a determination is made as to a direction and magnitude of the first predetermined signal value located on the first correlation plane, which represents the relative displacement of elements of the image flow over the predetermined time interval.

BRIEF DESCRIPTION OF THE DRAWINGS

The invention will be more fully understood from the following detailed description taken in conjunction with the accompanying drawings, in which:

FIG. 1b shows the method of reverse hierarchical processing the sample image of FIG. 1a;

FIG. 2 shows adjacent interrogation areas in a first image frame and adjacent interrogation areas in a second image frame of the sample image of FIG. 1a;

DETAILED DESCRIPTION OF THE INVENTION

Before describing the invention in detail, some introductory terms and their associated definitions and/or descriptions are described below.

| | |
|---|---|
| (A) | Index of interrogation area |
| (AB) | Interrogation area (A) & (B) |
| (B) | Index of interrogation area |
| $v''$ | Field of pixel intensity variance of a sub-image region in the second frame |
| $\rho$ | Cross-correlation coefficient field |
| $(\Omega)$ | Sum of several interrogation area |
| M | Interrogation area height or squared full image size |
| N | Interrogation area width or squared interrogation area size |
| $N_I$ | Number of combined interrogation areas |
| R' | Self-correlation of interrogation area in the first image |
| R'' | Self-correlation field of interrogation area in the second image frame |
| R | Cross-correlation field |
| C | Cross-covariance field |
| I' | First image frame |
| I'' | Second image frame |
| $I_M$ | Normalized interrogation area mask |
| ij | Pixel indices |
| (k) | Index of interrogation area |
| k, l | Spatial lag vector in pixels |
| S | Number of steps (or levels) in the spatial scale hierarchy |
| $\alpha$ | Search length after the first step in compressed image correlation |
| $\delta$ | Search length |
| $\gamma_o^n$ | retained pixel ratio; $0 < \gamma_o \leq 1$; n = 0 no compression; n = 1 single frame, n = 2 double frame compression |
| $\mu'$ | Mean pixel intensity of a sub-image region in the first frame |
| $\mu''$ | Mean pixel intensity field of a sub-image region in the second frame |
| $v'$ | Pixel intensity variance of a sub-image region in the first frame |

Figure 1A:
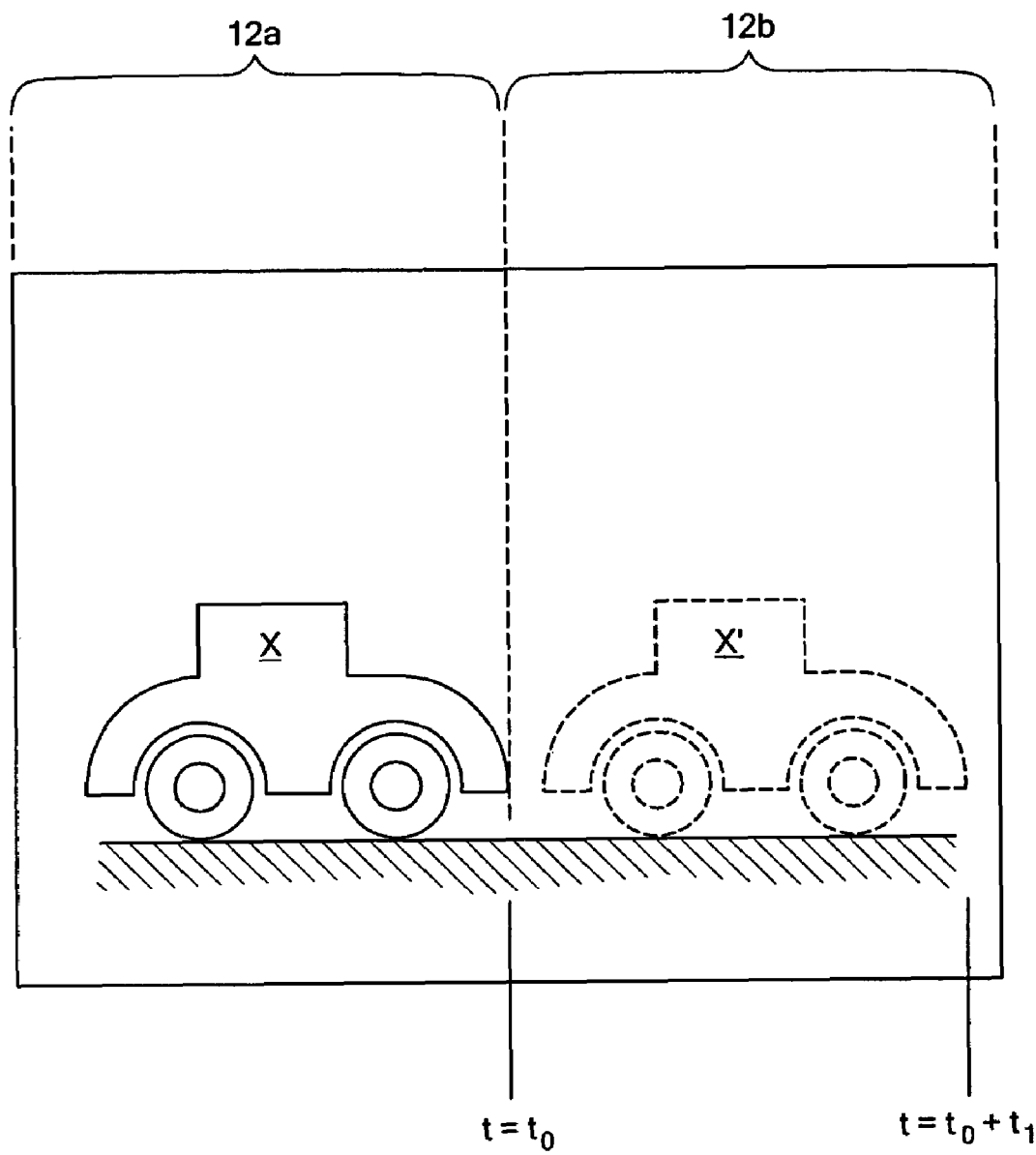
FIG. 1a shows a sample image subjected to a method of reverse hierarchical processing to determine a relative spatial displacement of pixels, objects and/or portions of the image in accordance with principles of the present invention.

FIG. 1a shows a first sample image 12a of an automobile X and a second sample image 12b of the automobile X' having a relative displacement with respect to the first sample image 12a of the automobile X over a predetermined time interval (e.g., from time $t=t_0$ to $t=t_0+t_1$). In order to determine the relative spatial displacement of the second sample image 12b of the automobile X', the first sample image 12a of the automobile X and the second sample image 12b of the automobile X' may be subjected to a method of reverse hierarchical processing, in accordance with principles of the present invention. The first and second sample images 12a, 12b are processed to determine a relative spatial displacement between pixels, objects and/or portions of the first and second sample images 12a, 12b over the predetermined time interval. Although the second sample image 12b of FIG. 1a shows the relative spatial displacement of an automobile X' for exemplary purposes, it should be understood that the invention is also applicable to determining the relative spatial displacement of particles associated with seeded fluid flow images, machine images and the like, as will become apparent from the description provided below.

Figure 1B:
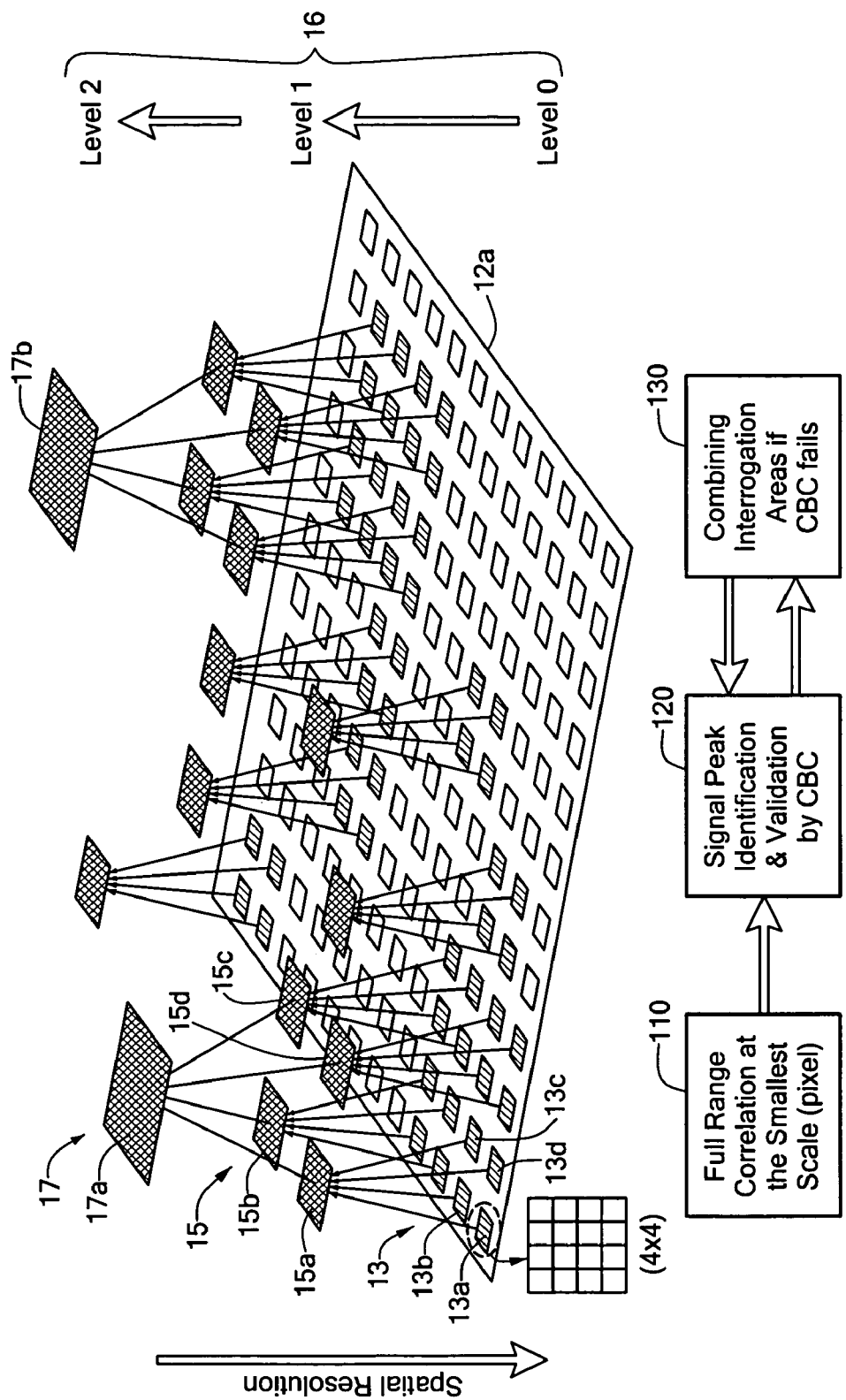

Referring now to FIG. 1b, shown is a method 100 of reverse hierarchical processing of the first sample image 12a (FIG. 1a), which is represented in FIG. 1b as an image array of pixels or pixel values, to determine a relative spatial displacement of pixels, pixel values, objects and/or portions of the first sample image 12a. The method 100 of reverse hierarchical processing of the present invention commences image processing at the smallest pixel resolution, as will be described in further detail below, and repeats processing at incrementally increased pixel resolutions until a valid displacement vector can be determined (reverse hierarchical processing in this sense means image processing from a relatively small pixel resolution to a larger pixel resolution).

In the exemplary embodiment, the method 100 of reverse hierarchical processing of the first and second sample images 12a, 12b includes, but is not limited to, resolving pixels, pixel values, objects and/or portions of the sample images 12a,12b at the smallest scale or pixel resolution (e.g., level-0) and locally stepping up to the next higher level (e.g. level-1) of pixel resolution if a valid image correlation cannot be determined at the current pixel resolution level, as will be described in detail below.

It should be understood that the method 100 of reverse hierarchical processing determines a relative spatial displacement of pixels, pixel values, objects and/or portions of the first sample image 12a to the second sample image 12b over time. More specifically, corresponding pixels, pixel values, objects and/or portions of the first and second sample images 12a, 12b may be correlated to determine the relative displacement between the pixels, pixel values, objects and/or portions of the first and second sample images 12a, 12b.

The first sample image 12a of the exemplary embodiment may be segmented into a plurality of interrogation areas 13, 15, 17, which are respectively located on level-0, level-1 and level-2 of a spatial scale hierarchy 16. The interrogation areas 13, 15, 17 may each represent different size, shape and/or portion of the first sample image 12a. Level-0 of the spatial scale hierarchy 16 includes interrogation areas 13a-13d, for example, having various sizes and/or shapes that each represent the smallest pixel resolution of the first sample image 12a. Level-1 of the spatial scale hierarchy 16 includes interrogation areas 15a-15d, for example, each of which is formed by selectively combining or grouping predetermined ones of the interrogation areas 13 located on level-0 of the spatial scale hierarchy 16. For example and as described further below, interrogation areas 13a, 13b, 13c, 13d can be grouped to form interrogation area 15a of the plurality of interrogation areas 15 located on level-1. Similarly, Level-2 of the spatial scale hierarchy 16 includes interrogation areas 17a-17d, for example, each of which is formed by selectively combining or grouping predetermined ones of the interrogation areas 15 located on level-1 of the spatial scale hierarchy 16. For example, and as described further below, interrogation areas 15a, 15b, 15c, 15d can be grouped to form interrogation area 17a of the plurality of interrogation areas 17 located on level-2.

In the exemplary embodiment, a first interrogation area 13a located on level-0 of the spatial scale hierarchy 16 represents the smallest meaningful spatial resolution of the first sample image 12a, which in this embodiment includes a 4×4 matrix of image pixels (e.g., 16-image pixels). It should be understood that the remaining interrogation areas located on level-0, such as interrogation areas 13b, 13c, 13d, may be similar to interrogation area 13a and represent other similarly-sized portions of the first sample image 12a.

At level-1 of the exemplary embodiment, a first interrogation area 15a includes the interrogation areas 13a, 13b, 13c, 13d, located on level-0, as described above, and represents a next greater size or larger pixel resolution of the first sample image 12a. In the exemplary embodiment, the first interrogation area 15a located on level-1 of the spatial scale hierarchy 16 includes an 8×8 matrix of image pixels (e.g., 64-image pixels). It should also be understood that the remaining interrogation areas located on level-1, such as the interrogation areas 15b, 15c, 15d, may be similar to the first interrogation area 15a and represent other similarly-sized portions of the first sample image 12a.

At level-2 of the exemplary embodiment, a first interrogation area 17a includes the interrogation areas 15a, 15b, 15c, 15d, located on level-1 of the spatial scale hierarchy 16, as described above, and represents a next greater size or larger pixel resolution of the first sample image 12a. In the exemplary embodiment, the first interrogation area 17a includes a 16×16 matrix of image pixels (e.g., 256-image pixels). It should also be understood that the remaining interrogation areas located on level-2, such as interrogation area 17b, may be similar to interrogation area 17a and can represent another similarly-sized portion of the first sample image 12a.

Although not specifically shown, it should be readily understood that additional levels may be provided to the spatial scale hierarchy 16, such as a level-3 for representing a still yet relatively larger portion of the first sample image 12a. Also, the minimum size or resolution of each of the interrogation areas 13, which are located on the level-0, can include a resolution as small as a 1×1 pixel matrix, or more simply, a single pixel. Further, the resolution of each of the interrogation areas 15, 17 located on each of the next higher levels of the spatial scale hierarchy 16 (e.g., level-1, level-2 . . . etc.) may be scaled to include a predetermined pixel resolution based on the resolution of the interrogation areas 13 located at level-0.

The method 100 of reverse hierarchical processing of the first sample image 12a, generally includes, at step 110, executing a process for performing a correlation at the smallest scale (pixel resolution) of each of the interrogation areas, such as interrogation areas 13a, 13b, 13c, 13d of level-0 of the spatial hierarchy 16. It should be understood that other image registration processing methods that involve larger than 1×1 pixel support regions for single disparity data, such as error correlation based optical flow methods. At step 120, it is determined whether a predetermined signal peak associated with each of the interrogation areas 13a, 13b, 13c, 13d for the images can be detected and validated using a correlation-based correction process (CBC), as will be described in further detail below. The detected and validated displacement vectors respectively associated with each of the interrogation areas 13a, 13b, 13c, 13d of the exemplary embodiment represent relative displacement of each of these interrogation areas 13a, 13b, 13c, 13d, between the first sample image 12a and the second sample image 12b, over the time interval from $t=t_0$ to $t=t_0+t_1$, as shown in FIG. 1a for example.

The detected and validated displacement vectors, as described above, further represent a statistical level of certainty as to the direction and distance that at least a portion of the first sample image 12a corresponding to the interrogation areas 13a, 13b, 13c, 13d, for example, moved over a time interval (e.g., $t=t_0$ to $t=t_0+t_1$ of FIG. 1a). This movement or relative spatial displacement of the first sample image 12a is represented by the second sample image 12b of FIG. 1a.

At step 130, if a predetermined signal peak associated with at least one of the interrogation areas 13a, 13b, 13c, 13 cannot be detected and validated using the CBC process, the method 100 includes combining or grouping the interrogation areas 13a, 13b, 13c, 13d to form the interrogation area 15a located on level-1 of the spatial hierarchy 16, for example. Interrogation area 15a, as described above, represents a larger size or greater pixel resolution of the first sample image 12a. The method 100 is thereafter redirected back to step 120 for repeating the process of determining whether a predetermined signal peak associated with the interrogation area 15a can be detected and validated using the CBC process. Steps 120 and 130, as described above, may be cyclically repeated while moving incrementally up the spatial hierarchy 16 until a valid signal peak is detected. In the exemplary embodiment, a valid signal peak may include a signal peak that is equal to or greater than a predetermined threshold.

The method 100 of reverse hierarchical processing the first sample image 12a, as described above, provides significant improvements over conventional hierarchical processing methods (e.g. hierarchical coarse-to-fine processing methods) in processing speed, adapting to local conditions, and the use of system resources for resolving the displacement of pixels, objects and/or portions of the first sample image 12a. The improvements in processing speed and the use of system resources are realized because information associated with an unresolved displacement vector or value (e.g., a predetermined signal peak associated with at least one of the interrogation areas 13, 15, 17, that cannot be detected and validated using the CBC process) can be used during processing at a next higher or greater spatial scale hierarchy 16 (e.g., level-1, level-2 . . . etc.) to minimize processing time and overhead at the next higher or great spatial scale hierarchy 16. For example, if a displacement vector or value associated with interrogation area 13a cannot be resolved, perhaps due to a low signal-to-noise ratio, the unresolved displacement vector or value information can be used during processing at the next higher or greater spatial scale hierarchy 16, which in this exemplary embodiment is interrogation area 15a.

The improvements in processing speed and the use of system resources are further realized because as soon as a valid displacement vector or value is determined for a particular interrogation area 13, 15, 17, respectively located on level-0, level-1 and level-2, the method 100 locally terminates with respect to the successfully resolved interrogation area 13, 15, 17. These improvements in processing speed and the use of system resources, as provided by the method 100 of reverse hierarchical processing the first sample image 12a of the present invention, as will be described in further detail below in connection.

Figure 2:
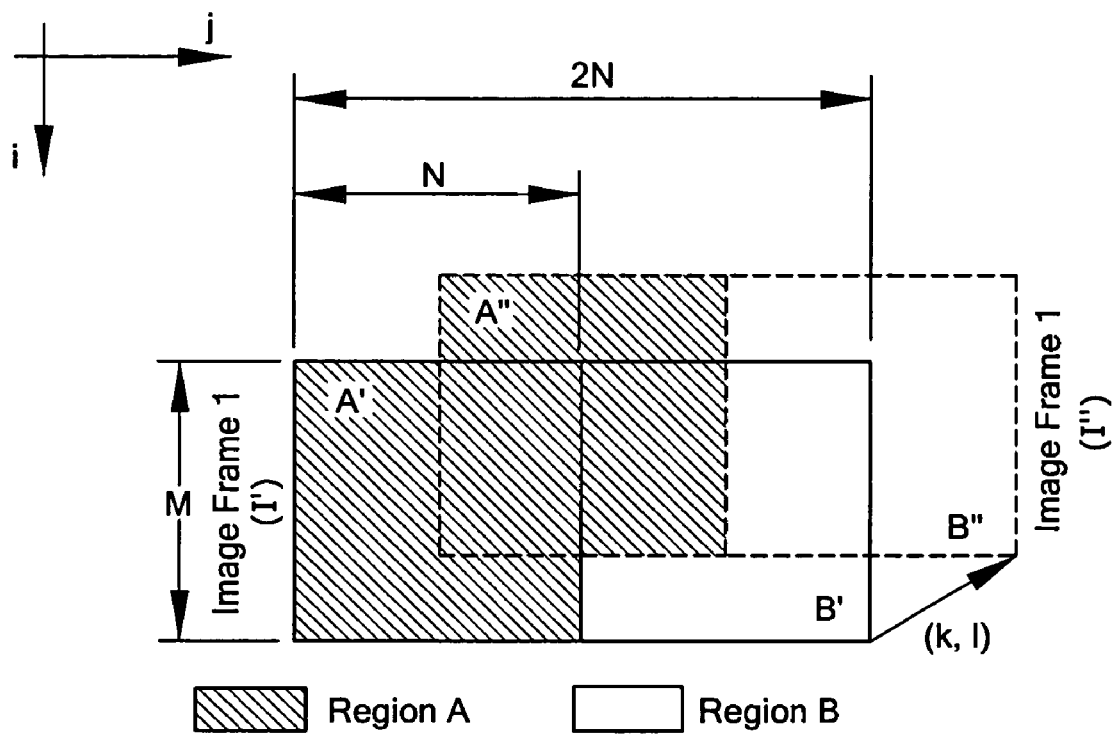

FIG. 2, shows adjacent interrogation areas (A', B') in a first image frame (I') and adjacent interrogation areas (A", B") in a second image frame (I"). FIG. 2 demonstrates the multi-resolution feature of discrete correlation, covariance, and correlation coefficient fields and shows how the method 100 (FIG. 1b) of the present invention can be provided for combining interrogation areas 13, 15, 17 or correlation plane levels-0, level-1, level-2 of the spatial scale hierarchy 16 (FIG. 1b), in a predetermined manner, as will be described in detail below.

Below is a description of the statistical nature of the discrete correlation function, as applied in the method 100 (FIG. 1b) of reverse hierarchical processing of the present invention. The statistical nature of the discrete correlation function requires combining signal content from several image pixels. This combination is usually embedded in calculating correlation between the interrogation area A' of the first image frame I' and the interrogation area A" of the second image frame I" as well as calculating correlation between the interrogation area B' of the first image frame I' and the interrogation area B" of the second image frame I" at every evaluated spatial lag (k,l) as a function of time (t). The Cross-correlation field of two image blocks (e.g., interrogation areas A', A" and B', B") including M×N number of pixels is calculated as shown in equation (1) below:

$$R_{k,l}^{(A)} = \frac{1}{MN} \sum_{i=1}^{M} \sum_{j=1}^{N} I'_{i,j} I''_{i+k,j+l} \quad (1)$$

where $I_{i,j}$ is the pixel intensity at location (i,j) and A is the index of the interrogation area and k,l is the spatial lag vector in pixels. Therefore, the discrete correlation is the average of relevant correlations of the pixels. This can be utilized in building correlation planes of larger interrogation windows by adding correlation matrixes of the composing areas together as shown in FIG. 1b and as expressed in equation (2) below:

$$R_{k,l}^{(AB)} = \frac{1}{2MN} \sum_{i=1}^{M} \left( \sum_{j=1}^{N} I'_{i,j} I''_{i+k,j+l} + \sum_{j=N+1}^{2N} I'_{i,j} I''_{i+k,j+l} \right) = \frac{1}{2}\left(R_{k,l}^{(A)} + R_{k,l}^{(B)}\right) \quad (2)$$

where B is the index of the interrogation area and k,l is the spatial lag vector in pixels.

Figures 3A, 3B:
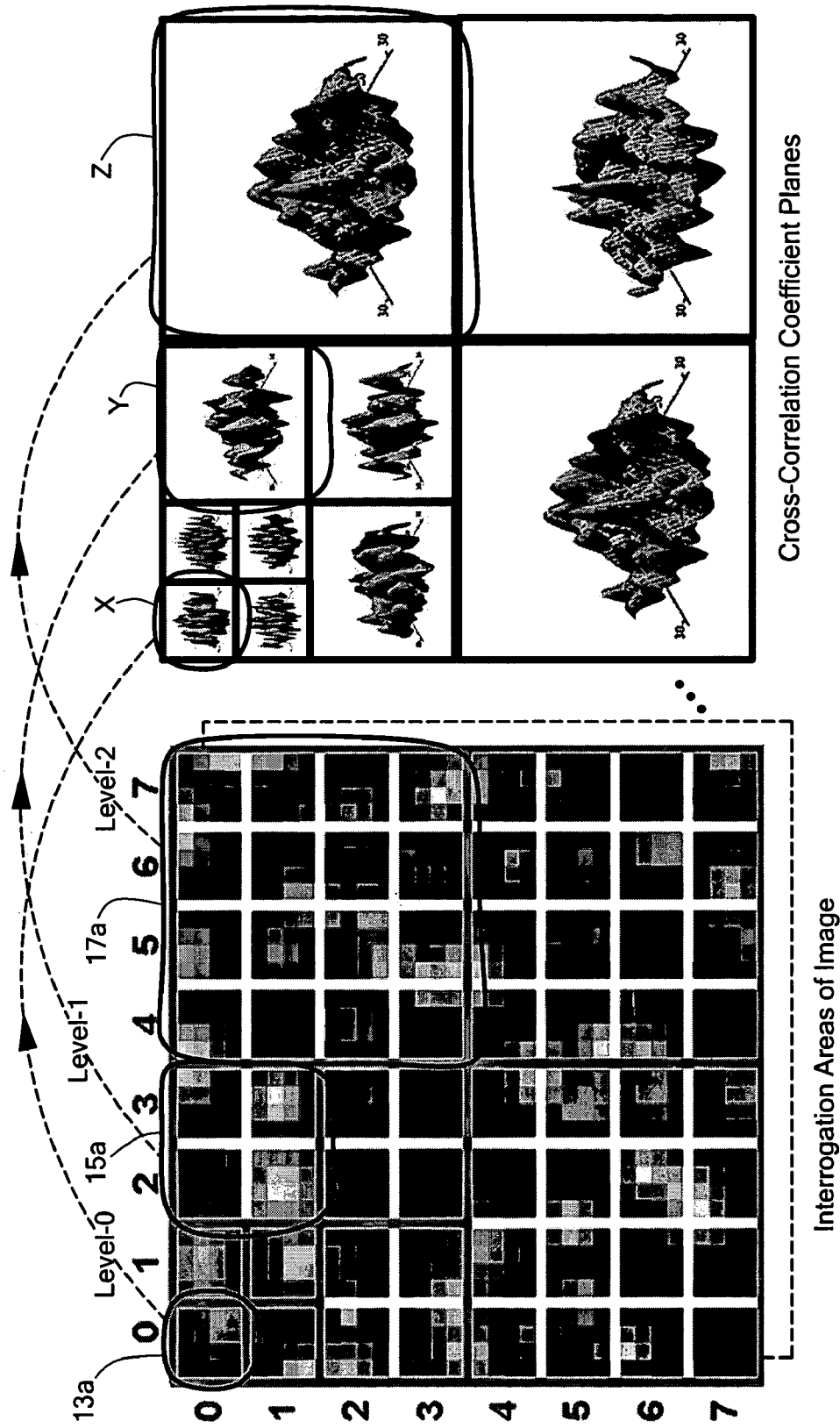
FIGS. 3a, 3b show a result of combining four cross-correlation coefficient planes relevant to four adjacent interrogation areas at three different levels of spatial scale hierarchy (smallest resolved scale: 4×4 pixels)

This suggests that the correlation plane relevant to a certain interrogation area size can be built by combining the appropriate correlations of the composing sub-image regions as expressed in equation (3) below and as illustrated in FIGS. 3a, 3b, which shows the results of combining four cross-correlation coefficient planes relevant to four adjacent interrogation areas, e.g., 13a-13d, 15a-15d, 17a-17d at three different levels of the spatial scale hierarchy 16 (FIG. 1b). In the exemplary embodiment, as described above, the smallest resolved scale includes a 4×4 matrix of image pixels. Further, equation (3), as described above, provides:

$$R^{(\Omega)} = \frac{1}{N_I} \sum_{k=1}^{N_I} R^{(k)} \quad (3)$$

where $R^{(k)}$ is the $k^{th}$ sub-correlation matrix, and $N_I$ is the number of sub-image regions which compose the larger interrogation area notated by $\Omega$. For ordinary correlation (R), this combination means ensemble averaging, as shown in equation (3) above. In the case of cross-covariance (correlation on local mean intensity subtracted image blocks) or cross-correlation coefficient (covariance normalized by local image intensity standard deviation) fields, this combination is slightly more complex as will be shown below. It should be understood that the following description of the term "correlation" includes all three variations of statistical displacement evaluation if otherwise not specified.

One feature of such combination of correlation planes is that it does not involve additional calculations as compared to computing the same correlation directly from the larger area of interest. Furthermore, entire correlation planes ($R^{(A)}$ and $R^{(B)}$ in FIG. 1b) are available at any level of the hierarchy. This can be advantageous in finding the valid signal peak if the candidate correlation peak is invalidated during post- or inter-level processing.

FIGS. 3a, 3b in conjunction with FIG. 1b, show a result of combining four cross-correlation coefficient planes relevant to four adjacent interrogation areas 13, 15, 17 respectively located at three different levels (e.g., level-0, level-1, level-2) of the spatial scale hierarchy 16. For example, the interrogation area 13a of FIG. 3a (e.g., with smallest meaningful scale: 4×4 pixels) can be processed at level-0 of the spatial hierarchy 16 to generate the cross-correlation coefficient plane X, as shown in FIG. 3b. Similarly, the interrogation areas 15a of FIG. 3a can be processed at level-1 of the spatial hierarchy 16 to generate the cross-correlation coefficient plane Y, as shown in FIG. 3b. The interrogation areas 17a of FIG. 3a can be processed at level-2 of the spatial hierarchy 16 to generate the cross-correlation coefficient plane Z, as shown in FIG. 3b. In each of the cross-correlation coefficient planes X, Y, Z, if a valid displacement vector can be determined (e.g., signal-to-noise ratio equal to or greater than a predetermined threshold value), the method 100 locally ends. Otherwise, if a valid displacement vector cannot be determined in each of the cross-correlation coefficient planes X, Y, Z, additional interrogation areas (neighboring interrogation areas) are combined or grouped and additional or new cross-correlation coefficient planes (not shown) are computed. These new cross-correlation coefficient planes will each include higher signal-to-noise ratios, which provides corresponding displacement vectors having greater magnitudes so that they can be resolved easier by threshold detection techniques.

In an exemplary embodiment, FIG. 3a shows first plurality of image pixels, which represents the first sample image 12a of the automobile X (FIG. 1a). Further, a second plurality of image pixels is also shown in FIG. 3a and is located directly behind the first plurality of image pixels, as denoted by the dashed line. The second plurality of image pixels represents the second sample image 12b of the automobile X' (FIG. 1a). In accordance with the present invention, similar interrogation areas from each of the first and second plurality of image pixels may be processed together to provide each of the corresponding cross-correlation coefficient planes, as shown in FIG. 3b. For example, the interrogation area 13a of the first plurality of image pixels can be processed with a similar interrogation region located on the second plurality of image pixels (represented by the dashed line in FIG. 3a) to provide the cross-correlation coefficient plane X, as shown in FIG. 3b. Further, the interrogation area 15a of the first plurality of image pixels can be processed with a similar interrogation region located on the second plurality if image pixels (represented by the dashed line in FIG. 3a) to provide the cross-correlation coefficient plane Y, as shown in FIG. 3b. Also, the interrogation area 17a of the first plurality of image pixels can be processed with a similar interrogation region located on the second plurality of image pixels (represented by the dashed line in FIG. 3a) to provide the cross-correlation coefficient plane Z, as shown in FIG. 3b.

One constraint of the stated equality of equation (2), as described above, is that the correlation at the smaller scale should be performed using a search region in the second image frame I" (FIG. 2) that is larger than the interrogation area in the first image frame I' (FIG. 2). This ensures that correlations at any spatial lag are unbiased, which mean that the full interrogation area size blocks of the respective first and second image frames I' and I" (FIG. 2) are taken into account over the entire correlation field.

A similar combination of correlation planes can also be performed in the case of calculating the cross-covariance field in order to remove background correlation and to improve signal quality. The cross-covariance of the first and second image frames or blocks I' and in I" (FIG. 2) at the (k,l) spatial lag is defined in equation (4) below as:

$$C_{k,l}^{(AB)} = \frac{1}{M(2N)} \sum_{i=1}^{M} \sum_{j=1}^{2N} I'_{i,j} I''_{i+k,j+l} - \mu'^{(AB)} \mu''^{(AB)}_{k,l} \quad (4)$$

where $\mu'^{(AB)}$ and $\mu''^{(AB)}_{k,l}$ are the local mean image intensities of the unified A', B' interrogation areas located in the first image frame (FIG. 2), and the unified A", B" interrogation areas located in the second image frame (FIG. 2). It should be understood that using uniform interrogation windows, as stated above to remove velocity bias and to allow combining correlation fields, results in spatial lag dependent mean image intensity for the larger interrogation area in order to accurately calculate the cross-covariance field. The mean intensities can also be calculated from composing the A', B' interrogation areas and the A", B" interrogation areas as set forth below in equations 5a and 5b.

$$\mu'^{(AB)} = \frac{1}{M(2N)} \sum_{i=1}^{M} \sum_{j=1}^{2N} I'_{i,j} = \frac{1}{2}\left(\mu'^{(A)} + \mu'^{(B)}\right) \quad (5a)$$

$$\mu''^{(AB)}_{k,l} \frac{1}{M(2N)} \sum_{i=1}^{M} \sum_{j=1}^{2N} I''_{i+k,j+l} = \frac{1}{2}\left(\mu''^{(A)}_{k,l} + \mu''^{(B)}_{k,l}\right) \quad (5b)$$

Using matrix notation the cross-covariance field at any level of the resolution hierarchy can be computed from the relevant cross-correlation fields and mean intensities of the previous higher resolution level using equation 6 as set forth below:

$$C^{(\Omega)} = \frac{1}{N_I} \sum_{k=1}^{N_I} R^{(k)} - \left(\frac{1}{N_I} \sum_{k=1}^{N_I} \mu'^{(k)}\right)\left(\frac{1}{N_I} \sum_{k=1}^{N_I} \mu''^{(k)}\right) \quad (6)$$

where $R^{(k)}$ is the $k^{th}$ cross-correlation matrix, $N_I$ is the number of sub-image regions which compose the larger interrogation area notated by $\Omega$. As can be seen, apart from storing the entire correlation planes relevant to every $k^{th}$ sub-image region, the cross-covariance requires keeping the local mean intensities of the first and second image blocks in memory, as well.

Normalizing the cross-covariance field by the local standard deviations of image intensities can improve sub-pixel accuracy. The resulting cross-correlation coefficient field can also be built in the same way as the cross-covariance field. The cross-correlation coefficient of two image blocks I' and I" (FIG. 2) is defined at the (k,l) spatial lag which is represented in equation 7 below:

$$\rho_{k,l}^{(AB)} = \frac{C_{k,l}^{(AB)}}{\sqrt{v'^{(AB)}} \sqrt{v''^{(AB)}_{k,l}}} \quad (7)$$

where C is the cross-covariance field and $v'^{(A,B)}$ and $v''_{k,l}^{(A,B)}$ are the local image intensity variances of the A' B' interrogation areas located in the first image frame (FIG. 2) and the A", B" interrogation areas located in the second image frame (FIG. 2). Here again, the enlarged second interrogation area v" depends on the evaluated shift between interrogation areas A' B' and A", B". The local image intensity variances can also be built by using the intensity variances of the composing sub-image regions, as shown below in equation 8.

$$v'^{(AB)} = \frac{1}{M(2N)} \sum_{i=1}^{M} \sum_{j=1}^{2N} (I'_{i,j} - \mu'^{(AB)})^2 \quad (8)$$

$$= \frac{1}{2} \frac{1}{MN} \sum_{i=1}^{M} \left( \sum_{j=1}^{N} I'^{2}_{i,j} + \sum_{j=N+1}^{2N} I'^{2}_{i,j} \right) - (\mu'^{(AB)})^2$$

$$= \frac{1}{2}(R'^{(A)} + R'^{(B)}) - \left[\frac{1}{2}(\mu'^{(A)} + \mu'^{(B)})\right]^2$$

where $R'_{(A)}$ and $R'^{(B)}$ are the self-correlations of region (A) and (B) in the first image frame. The intensity variance of the second image block at the (k,l) spatial lag is represented in equation 9 below as:

$$v''^{(AB)}_{k,l} = \frac{1}{M(2N)} \sum_{i=1}^{M} \sum_{j=1}^{2N} (I''_{i+k,j+l} - \mu''^{(AB)}_{k,l})^2 \quad (9)$$

$$= \frac{1}{2} \frac{1}{MN} \sum_{i=1}^{M} \left( \sum_{j=1}^{N} I''^{2}_{i+k,j+l} + \sum_{j=N+1}^{2N} I''^{2}_{i+k,j+l} \right) - (\mu''^{(AB)}_{k,l})^2$$

$$= \frac{1}{2}(R''^{(A)}_{k,l} + R''^{(B)}_{k,l}) - \left[\frac{1}{2}(\mu''^{(A)}_{k,l} + \mu''^{(B)}_{k,l})\right]^2$$

where $R''_{k,l}{}^{(A)}$ and $R''_{k,l}{}^{(B)}$ are the (k,l) spatial lag relevant local self-correlations of interrogation areas A", B" located on the second image frame, $\mu''$ is the mean pixel intensity field of a sub-image region in the second frame; i and j are pixel indices. Using matrix notation, the local variances of the image intensities can be transferred from a higher spatial resolution layer to the next lower resolution layer as represented by equations 10a and 10b below.

$$v'^{(\Omega)} = \frac{1}{N_I} \sum_{k=1}^{N_I} R'^{(k)} - \left(\frac{1}{N_I} \sum_{k=1}^{N_I} \mu'^{(k)}\right)^2 \quad (10a)$$

$$v''^{(\Omega)} = \frac{1}{N_I} \sum_{k=1}^{N_I} R''^{(k)} - \left(\frac{1}{N_I} \sum_{k=1}^{N_I} \mu''^{(k)}\right)^2 \quad (10b)$$

The normalization requires storing the self-correlation of the interrogation areas of the first image frame and the self-correlation matrixes of the sub-image regions of the image second frame in memory. Table 1 below summarizes the above cases showing the equations that allow transforming the correlation results from one spatial resolution layer to the next lower resolution layer and the parameters that are needed to be stored in memory for these transformations.

TABLE 1

Multi-resolution discrete correlation equations and the parameters as stored in memory.

| | | | Parameters | |
| --- | --- | --- | --- | --- |
| | | | Scalar | Matrix |
| Cross-Correlation | $R^{(\Omega)} = \frac{1}{N_I} \sum_{k=1}^{N_I} R^{(k)}$ | | — | $R^{(k)}$ |
| Cross-Covariance | $C^{(\Omega)} = R^{(\Omega)} - \left(\frac{1}{N_I}\sum_{k=1}^{N_I}\mu'^{(k)}\right)\left(\frac{1}{N_I}\sum_{k=1}^{N_I}\mu''^{(k)}\right)$ | | $\mu'^{(k)}$ $\mu''^{(k)}$ | $R^{(k)}$ |
| Cross-Correlation Coefficient | $\rho^{(\Omega)} = \dfrac{C^{(\Omega)}}{\sqrt{\frac{1}{N_I}\sum_{k=1}^{N_I} R'^{(k)} - \left(\frac{1}{N_I}\sum_{k=1}^{N_I}\mu'^{(k)}\right)^2} \left(\sqrt{\frac{1}{N_I}\sum_{k=1}^{N_I} R''^{(k)} - \left(\frac{1}{N_I}\sum_{k=1}^{N_I}\mu''^{(k)}\right)^2}\right)}$ | | $\mu'^{(k)}$ $\mu''^{(k)}$ $R'^{(k)}$ $R''^{(k)}$ | $R^{(k)}$ $\mu'^{(k)}$ $\mu''^{(k)}$ $R'^{(k)}$ $R''^{(k)}$ |

The correlation planes ($R^{(k)}$) that are involved in the combination do not necessarily come from adjacent interrogation areas, such as adjacent interrogation areas A' B' and A", B" of FIG. 2. Combining correlation planes relevant to any interrogation area pattern (e.g., chess board) makes the method 100 (FIG. 1b) of reverse hierarchical processing of the present invention flexible, as well as providing other advantages, such as signal content-based combination, which is described in further detail below.

At this point, spatial combinations of correlation results have been described. However, it should be understood that the same equations may apply in the temporal combination of correlation planes, which provides more reliable and accurate statistical flow parameter estimation with extremely high resolution (e.g., on the order of about 1×1 pixels). Based on the above-derived equations, temporal combination of correlation planes can be considered with multi-resolution both in space and in time. The latter requires calculating the ensemble average of the parameters in Table 1 on the fly; otherwise, an undesirably large amount of memory is required to combine results from a statistically meaningful sample. Calculating the ensemble average of the parameters in Table 1 may be accomplished with equation (11) as follows:

$$\overline{P_{m+1}} = \frac{1}{m+1}(m\overline{P_m} + P_{m+1}) \quad (11)$$

where $$\overline{P_m} = \sum_{k=1}^{m} P_k / m$$

is the ensemble average of m previous results of the P parameter.

The described multi-resolution capability of calculating the correlation field is advantageous together with an efficient signal peak searching procedure that is able to identify the actual correlation peak at low signal-to-noise ratio due to small interrogation area sizes. The CBC processing, as described above, is such a peak searching and validation method. One exemplary CBC peak searching and validation method is provided by Hart D P (2000) PIV error correction; Experiments in Fluids 29(1):13-22 (hereinafter referred to as "Hart D P (2000) PIV error correction"), the subject matter of which is hereby incorporated by reference in its entirety.

The CBC peak searching and validation method includes multiplying correlation table elements of adjacent sub-image areas assuming over-sampled interrogation of the disparity field and relying on the stochastic nature of the false correlation field. The element-by-element multiplication of correlation values results in a significantly suppressed noise field and an enhanced signal peak. This correlation error correction method, used in coarse-to-fine processing, allows achieving relatively high resolution down to the image size of a single seeding particle. One exemplary method of providing the above-described correlation error correction, as used in coarse-to-fine processing and which provides relatively high resolution down to the image size of a single seeding particle, can be provided by Hart D P (2000) Super-resolution PIV by recursive local-correlation; Journal of Visualization, The Visualization Society of Japan and Ohmsha, Ltd. 3(2):187-194, the subject matter of which is hereby incorporated by reference in its entirety.

The CBC peak searching and validation method provided by Hart D P (2000) PIV error correction, as described above, which may be incorporated in reverse hierarchical processing of the present invention, provides identification of signal correlation peaks at spatial scale hierarchy levels of the processing. Further, the CBC peak searching and validation method provided by Hart D P (2000) PIV error correction, which may be incorporated in the method 100 (FIG. 1b) of reverse hierarchical processing of the present invention, guides the combination of neighboring sub-image blocks if the examined interrogation area do not give a valid result.

Figure 4A:
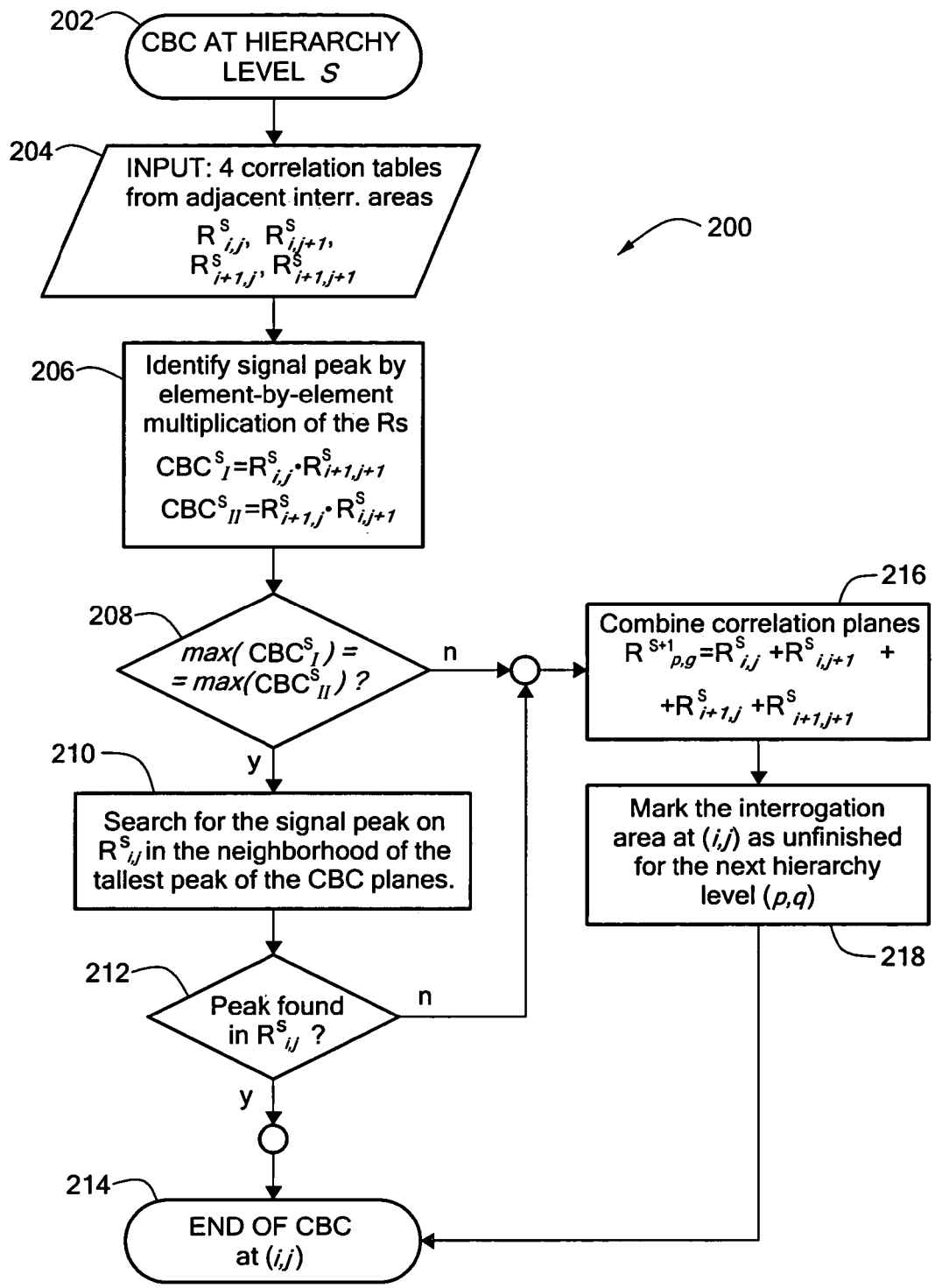
FIG. 4a shows a flowchart of implementing the Correlation Based Correction (CBC) algorithm to identify and validate a correlation signal peak and for deciding if the combination of correlation fields is necessary.
Figure 4B:
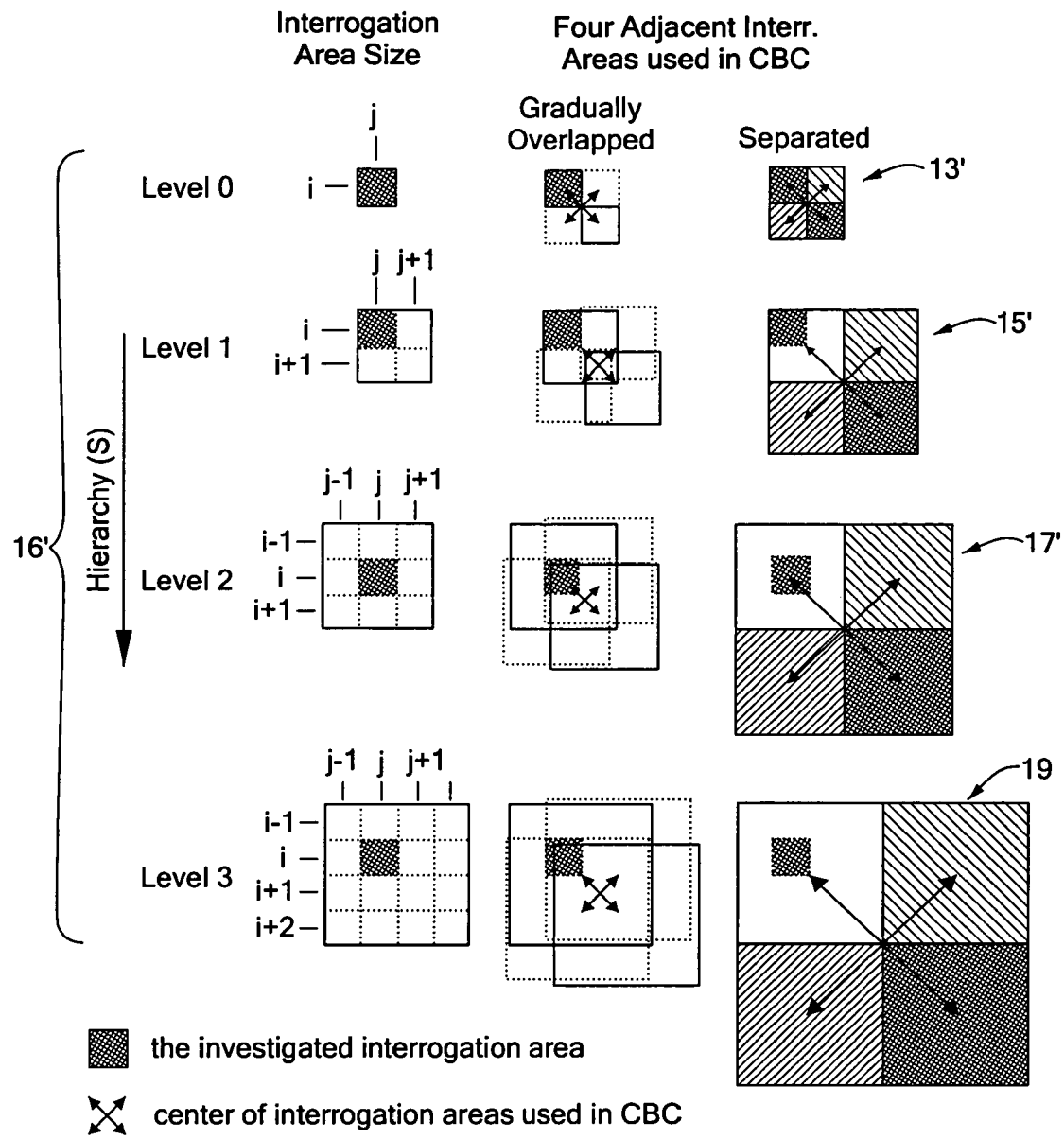
FIG. 4b shows interrogation area size and the relative location of the four sub-image regions for the two CBCs at increasing hierarchy levels.

FIGS. 4a and 4b, collectively show the core of the adapted CBC peak searching and validation algorithm or method 200 provided by Hart D P (2000) PIV error correction, which is used in conjunction with the method 100 (FIG. 1b) of reverse hierarchical processing of the present invention.

FIG. 4b is similarly constructed and arranged as FIG. 1b, as described above in detail, and includes a spatial scale hierarchy 16' defining levels 0-3 (as opposed to levels 0-2 in FIG. 1b) each of which levels 0-3 respectively include interrogation areas 13', 15', 17', 19.

At step 202 of FIG. 4a, the CBC peak searching and validation method 200 includes selecting a level from the spatial scale hierarchy 16', such as level-0, level-1, level-2 or level 3 of FIG. 4b for respectively processing interrogation areas 13', 15', 17', 19. At step 204, four correlation tables from adjacent interrogation areas 13', 15', 17', 19 are provided to the algorithm. At step 206, a signal peak associated with one of the interrogation areas 13', 15', 17', 19 is identified on an element-by-element (e.g., pixel-by-pixel) basis by performing two CBCs at each sub-image block using its three neighbors to the right and bottom, which ensures high signal peak detectability in two steps. First the validity of the tallest peak in the first CBC plane (e.g., $CBC^S_I$) is checked and this check is followed by searching for a second signal peak (e.g., $CBC^S_{II}$) in the original correlation plane in the vicinity of the CBC peak using a ±1 pixel search area. At step 208 a comparison-test is conducted for determining whether the tallest or maximum peak in the first CBC plane (e.g., $CBC^S_I$) is equivalent to the tallest or maximum peak in the original correlation plane, which is the second signal peak (e.g., $CBC^S_{II}$), as described above. If the comparison-test is true, at step 210, a signal peak search is conducted on the first CBC plane in the region of the tallest peak. At step 212, if the peak is found, the process ends at step 214.

At step 216, if for any reason the comparison-test at step 208 fails, the correlation planes of the adjacent regions are combined or grouped (using the equations in Table 1) to increase signal strength (increase signal-to-noise ratio). At step 218, the interrogation area 13', 15', 17', 19, which are associated with the combined correlation planes of step 216, are marked as unfinished and will be further processed at the next greater level of the spatial scale hierarchy 16'. Since correlation planes are available on a regular mesh at the finest evaluated spatial scale (e.g., Level-0), and unbiased correlations are calculated at every correlation table element, this combination can take place in several ways.

Moreover, FIG. 4b shows two possible solutions in light of using the CBCs at higher hierarchy levels. In the first case, correlation planes are combined or grouped in a way that results in increasingly or gradually overlapping areas of the four sub-image regions used in CBC at higher hierarchy levels. In the second case, interrogation areas do not overlap and CBC is applied using four independent image regions. It should be understood that although inter-level validation is an important aspect of the method 100 (FIG. 1b) of the present invention, a number of other methods that can identify a signal peak embedded in noise can also be used.

As shown in equation (2) above, combining cross-correlation planes or grouping interrogation areas 13', 15', 17', 19 in order to get correlations at larger spatial scales does not involve any additional computation compared to calculating the correlations directly using the larger interrogation areas. In most cases it reduces the computational cost of the entire computation depending on the flow (e.g., fluid flow of the exemplary embodiment) and processing parameters.

Figure 5:
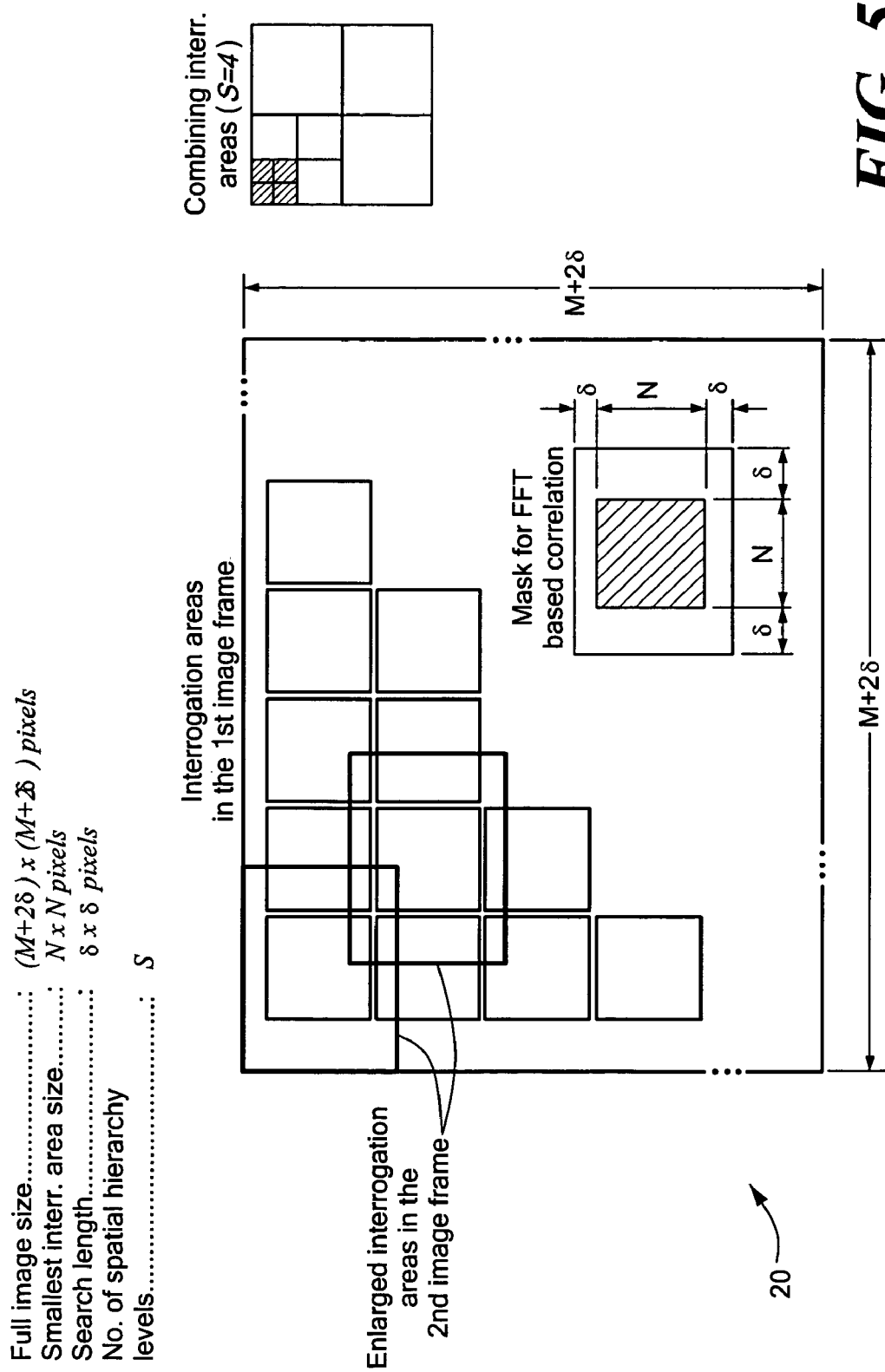
FIG. 5 shows interrogation areas in a first image frame.

FIG. 5 shows a number of correlation planes and/or interrogation areas 20 that are computed using Table 2 (shown below), which shows the total numbers of multiplications and additions for computing the number of correlation planes and/or interrogation areas 20 (except the normalization by the total number of pixels). The number of correlation planes and/or interrogation areas 20 of FIG. 5 are computed using a predetermined compressed image correlation method in a coarse-to-fine hierarchical manner. In the exemplary embodiment, the predetermined compressed image correlation method can be provided by Hart D P (1998) High-speed PIV analysis using compressed image correlation; Journal of Fluids Engineering 120(3):463-470, the subject matter of which is hereby incorporated by reference in its entirety.

At this point, the number of steps (or levels) in the method 100 (FIG. 1b) of reverse hierarchical processing of the present invention may appear to be similar other hierarchical image processing methods. However, this may not be the case because combining correlation planes in accordance with the method 100 (FIG. 1b) of reverse hierarchical processing of the present invention can be stopped locally based on determining a valid signal peak result of inter-level signal peak validation process, as described above in con-

TABLE 2

Computational cost (see FIG. 5 for illustration)

| | No. of Multiplications | | No. of Additions | |
|---|---|---|---|---|
| Recursive Compressed Image Correlation in S Steps (Hart, 1998, 2000a) | $\underbrace{4\gamma_o^n \delta^2 M^2}_{\text{1st step}} + \underbrace{4\alpha^2 M^2 (S-1)}_{\text{next (S-1) steps}}$ | | $\underbrace{4\delta^2 M^2 \left(\gamma_o^n - \frac{1}{N^2 2^{2S-2}}\right)}_{\text{1st step}} + \underbrace{4\alpha^2 M^2 \left[(S-1) - \frac{1}{N^2}\sum_{k=2}^{S}\frac{1}{2^{2S-2k}}\right]}_{\text{next (S-1) steps}}$ | |
| Reverse Hierarchical Compressed Image Correlation in S steps | $\underbrace{4\gamma_o^n \delta^2 M^2}_{\text{1st step}}$ | | $\underbrace{4\delta^2 M^2 \left(\gamma_o^n - \frac{1}{N^2}\right)}_{\text{1st step}} + \underbrace{12\delta \frac{M^2}{N^2}\sum_{k=2}^{S}\frac{1}{2^{2S-2k}}}_{\text{next (S-1) steps}}$ | |

It can be shown, using the sum of the finite length geometric progression in the equation of the reverse hierarchical processing, that the total cost in processing resources of the reverse hierarchical processing is equal to the cost in processing resources of the first step of the recursive compressed image correlation. In particular, this means that calculations after the first step in the conventional hierarchical processing can be eliminated by the method of reverse hierarchical processing of the present invention.

Processing and fluid flow parameters determine whether this saving is significant or not. For example, in the conventional hierarchical processing (e.g., coarse-to-fine correlation plane processing), obtaining spatial resolutions of the spot size of a particle image (2-3 pixels) requires many more steps than the more common use of interrogation area sizes in the range of 8-16 pixels. If this is combined with large displacement variations across the flow field, then the search length after the first step cannot be reduced significantly.

Figure 6A:
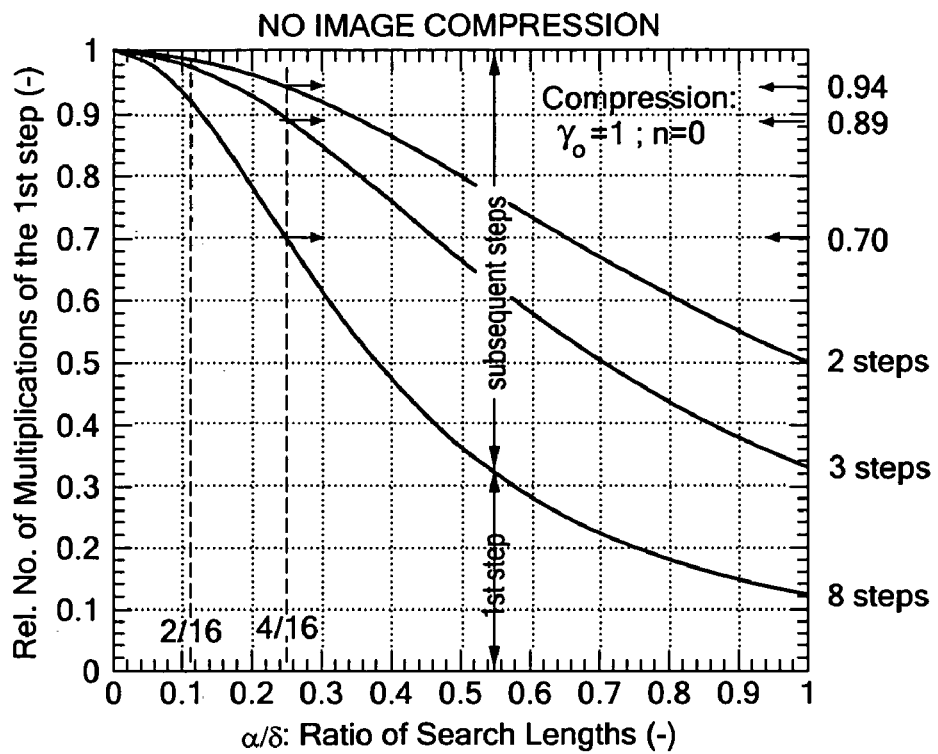
FIGS. 6a and 6b respectively show graphs representing a relative number of multiplications divided between the first and the subsequent steps of the Recursive Compressed Image Correlation according to Table 2 versus the ratio of the search length in the first step to that of the subsequent steps for which no image compression is used (FIG. 6a) and for which image compression is used (FIG. 6b)

FIG. 6a shows that this can result in a shift in the balance of computations between the first and the subsequent steps with as high as 30% of the total computations taking place after the first step (see the 8 steps curve at $\alpha/\delta=4/16$ in FIG. 6a). Furthermore, applying compressed image correlation at the first step can further increase the relative amount of computations in the subsequent stages.

Figure 6B:
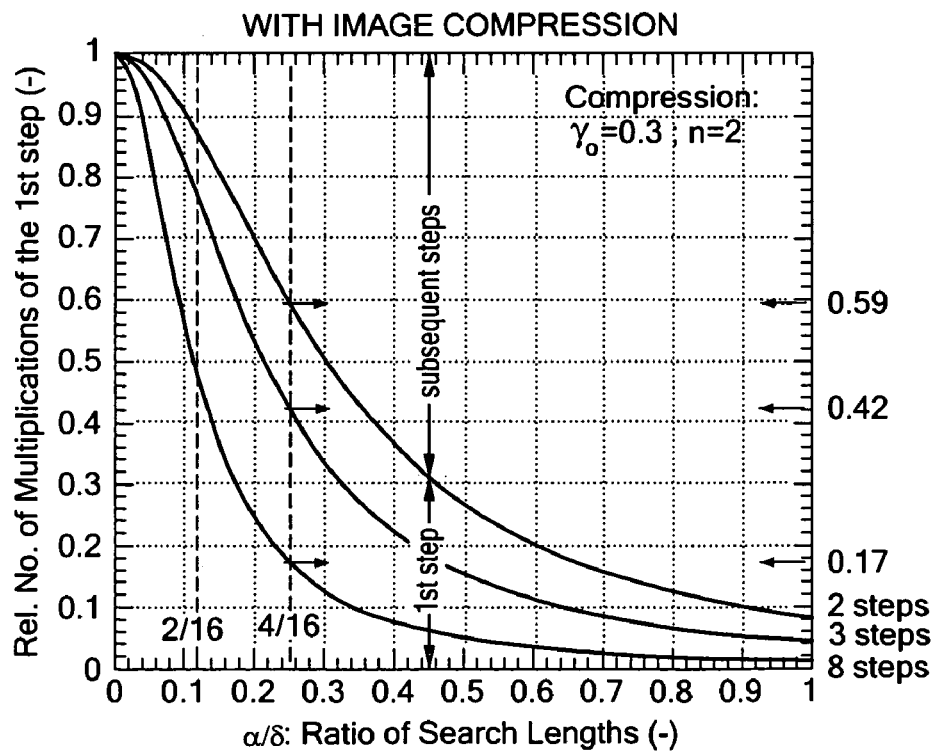

FIG. 6b shows such a case (see the 8 steps curve at $\alpha/\delta=4/16$ in FIG. 6b) when approximately 30% of the pixels are retained for correlation on both the first image frame and the second image frame. The effect of this is that the relative computational load after the first step increases up to 83%, which could be saved by using the method of reverse hierarchical processing of the present invention. Gradually relaxing image compression through the steps with fully retained pixel information at the final spatial scale can change this result slightly, but cannot reduce the computational cost compared to the method of reverse hierarchical processing of the present invention. This comparison remains true regardless of the way the correlation plane is calculated.

nection with FIGS. 4a and 4b. For example, in FIG. 1b, if a valid signal peak is detected while correlating interrogation area 15a of level-1, the inventive method 100 of processing image 12a may stop locally at interrogation area 15a because the displacement of this portion of the image 12a has been resolved. More particularly, this means that the size of the largest evaluated interrogation area (13, 15, 17 of FIG. 1b) size changes locally and the method 100 (FIG. 1b) can adapt itself to local fluid flow, seeding, and imaging conditions. This feature becomes more emphasized when processing takes place on the fly versus determining the largest required interrogation area size by trial-and-error after acquiring and saving the image pairs. The adaptive behavior of the method 100 (FIG. 1b) of reverse hierarchical processing of the present invention results in varying computational cost savings and depends strongly on measurement conditions.

For example, image pairs of a fluid flow field with dense homogeneous seeding and uniform velocity distribution is likely processed using the same number of steps all over the field and the computational cost saving by the method 100 (FIG. 1b) of reverse hierarchical processing of the present invention may not be significant. On the other hand, the processing of fluid flow fields with an inhomogeneous seeding distribution and/or large velocity gradients using conventional hierarchical processing with globally set upper and lower spatial resolution limits results in unnecessary computations at the top of the hierarchy (with large interrogation areas) in many regions. While at the same time, in some other areas of the fluid flow the globally set smallest spatial scale size at the bottom of the hierarchy does not give the highest possible resolution. In such a situation, the method 100 (FIG. 1b) of reverse hierarchical processing of the present invention permits locally optimized solutions by varying resolution up to the highest locally available value, which can save a relatively large amount of computations compared to conventional forward hierarchical processing schemes.

Figure 7A:
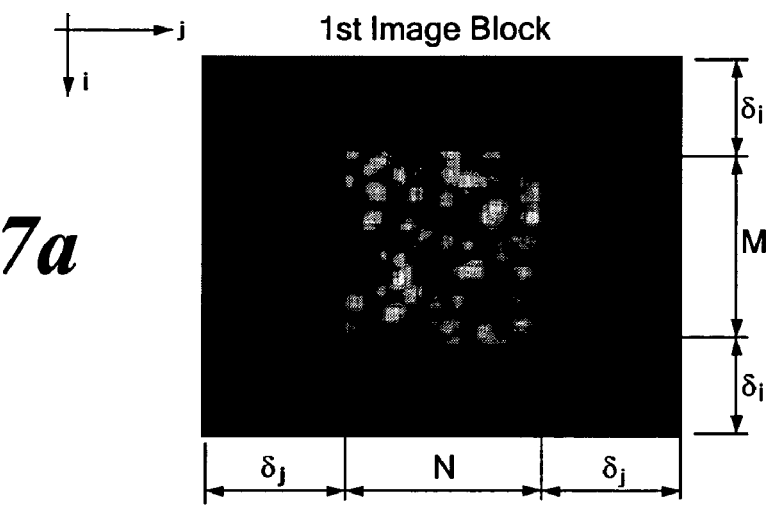
FIGS. 7a, 7b, 7c shows zero padding of the first interrogation area in order to get an unbiased full frame correlation at all evaluated spatial lags.
Figure 7B:
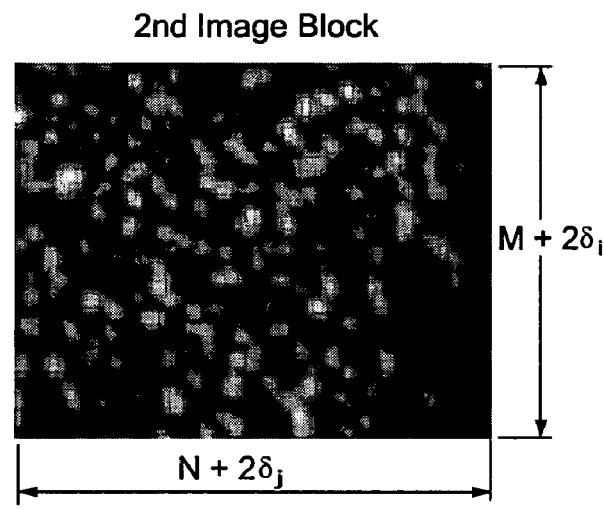
Figure 7C:
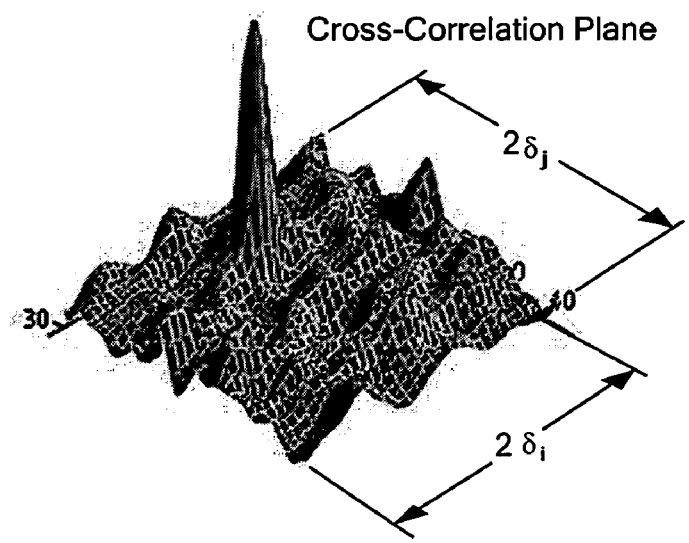

Referring to FIG. 7a, 7b, 7c (collectively referred to as FIG. 7), as described above, the combination of correlation planes of adjacent image interrogation areas requires using either an enlarged first or second interrogation area at the smallest evaluated spatial scale. In FIG. 7, this constraint can be satisfied if direct correlation is used, but requires padding the first or the second interrogation area by zeros using an interrogation area mask if correlation is performed in the spatial frequency domain. The mask can also be used to cut spatial lag relevant regions from the second (or the first) image block with the help of which local mean and variance of image intensity can be computed via a predetermined FFT process. In the exemplary embodiment, the predetermined FFT process can be provided by Ronneberger O; Raffel M; Kompenhans J (1998) Advanced evaluation algorithms for standard and dual plane Particle Image Velocimetry. Proc. 9th Int. Symp. on Application of Laser Techniques to Fluid Mechanics, July 13-16th, Lisbon, Portugal, Paper 10.1, the subject matter of which is hereby incorporated by reference in its entirety.

Using this masked correlation, the multi-resolution property of cross-correlation, cross-covariance, and cross-correlation coefficient can be utilized as described above. For example, the cross-correlation coefficient for the FFT based processing is defined as follows.

$$\rho^{(k)} = \frac{C^{(k)}}{\sqrt{v'^{(k)}} \sqrt{v''^{(k)}}} = \frac{\overbrace{(I_M \cdot I'^{(k)}) \otimes I''^{(k)}}^{R^{(k)}} - \mu'^{(k)} \overbrace{(I_M \otimes I''^{(k)})}^{\mu''^{(k)}}}{\sqrt{v'^{(k)}} \sqrt{\underbrace{I_M \otimes (I''^{(k)})^2}_{R''^{(k)}} - \underbrace{(I_M \otimes I''^{(k)})^2}_{\mu''^{(k)}}}} \quad (12)$$

where $I_M$ is a normalizing interrogation area mask which is defined below in equation 13 as:

$$I_{M i,j} = \begin{cases} (MN)^{-1} & \text{if } (i, j) \text{ is inside the first image block} \\ 0 & \text{otherwise} \end{cases} \quad (13)$$

$I'^{(k)}$ is the smaller first image block, $I''^{(k)}$ is the larger second image block at the $k^{th}$ position, and is the cross-correlation operator. It should be understood that the FFT based cross-correlation can be relatively inefficient at large interrogation area sizes (e.g., represented as M×N) together with short search lengths ($\delta_i \times \delta_j$) compared to direct correlation. The FFT based cross-correlation can be relatively inefficient because the size of the actual evaluated correlation plane in the spatial frequency domain is (M+2 $\delta_i$)×(N+ 2$\delta_j$), but the center 2$\delta_i$×2$\delta_j$ region contains accurate data that can be used to combine correlation planes. This drawback to FFT based cross-correlation provides an additional motivation for the method 100 (FIG. 1b) of reverse hierarchical processing of the present invention, in which case FFT would be used at the smallest interrogation area sizes, and any further calculations, which mainly means additions to build correlation planes at a larger spatial scale (e.g., as shown in Table 2), are performed directly. Thus, if correlation is done in the spatial frequency domain, the method 100 (FIG. 1b) of reverse hierarchical processing of the present invention can be represented as a hybrid FFT-direct correlation algorithm.

Figure 8:
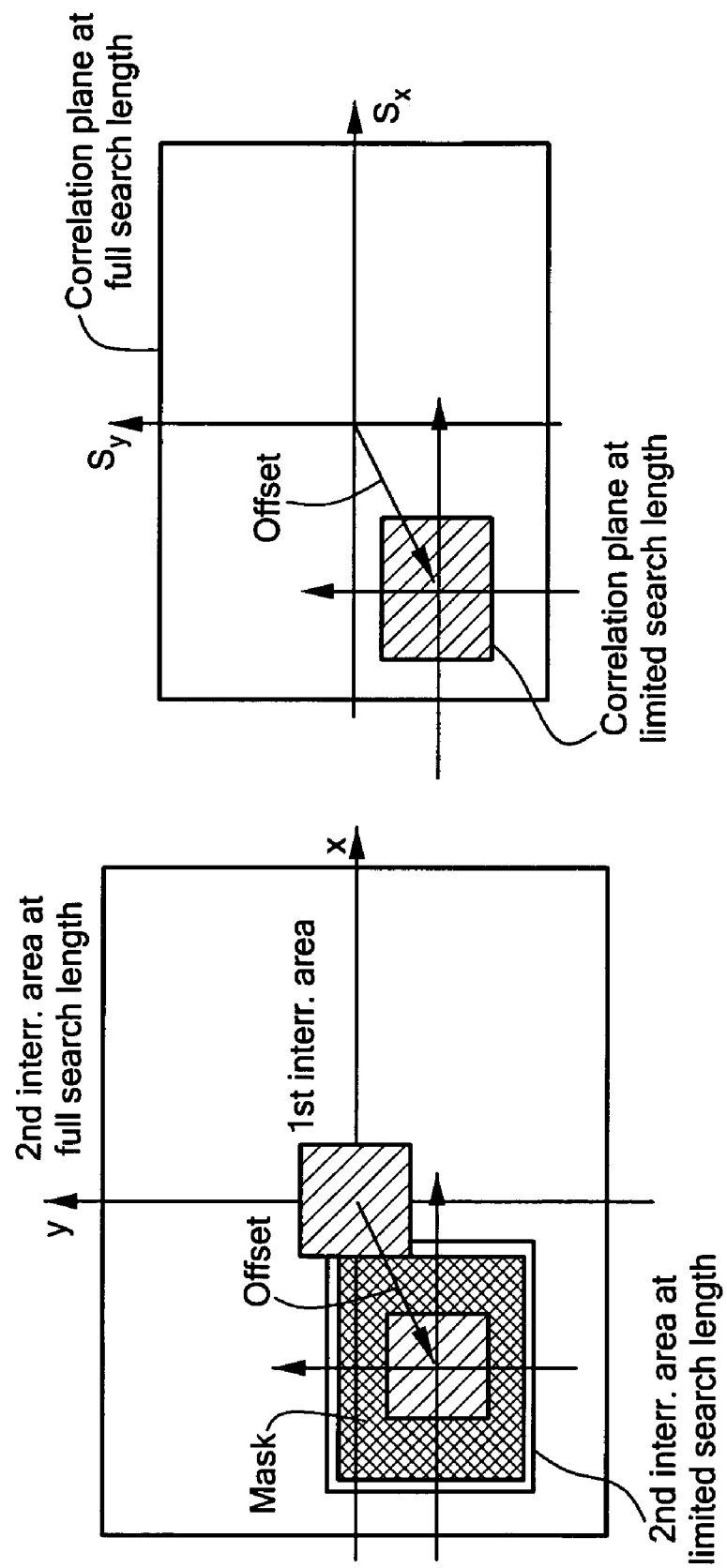
FIG. 8 shows interrogation areas for full and limited search length FFT based correlations with relevant normalizing and zero padding mask.

Referring to FIG. 8, the flexibility of the direct correlation in calculating arbitrary sub-regions of the correlation plane can also be accomplished by FFT. In FIG. 8, the direct correlation in calculating the arbitrary sub-regions of the correlation plane requires taking the second image block from the limited search length relevant location given by the offset vector of the full size correlation plane to the center of the sub-correlation region. In this case, the normalizing and zero padding mask ($I_M$) is centered in the second image block and we can use the above FFT based algorithm that considers centered mask location exactly as at full search length. Certainly, the offset vector of the correlation plane needs to be added to the final displacement result, which comes centered to the sub-correlation region.

An optimal PIV image with homogeneous seeding distribution contains minimal or no visual information on the investigated fluid flow field. In the majority of actual measurements, however, it may be difficult to achieve such an optimal condition and depending on the frequency response of the applied seeding particle, different regions of the flow field may become visible due to the well-known Stokes effect on particles. In particular, this means that particle images in some regions of a fluid flow become sparse and cover a fraction of the usual interrogation area sizes. Hybrid PIV/PTV processing methods can handle such cases by identifying individual particles within the interrogation areas in the second stage of the processing after conventional sub-image block interrogation. For example, one hybrid PIV/PTV method can be provided by Keane R D; Adrian R J; Zhang Y (1995) Super-resolution particle image velocimetry; Measurement Science and Technology 6(6): 754-768, the subject matter of which is hereby incorporated by reference in its entirety.

Figure 9A:
FIGS. 9a, 9b, 9c show selectively adding image regions for providing a combined correlation plane.
Figure 9B:
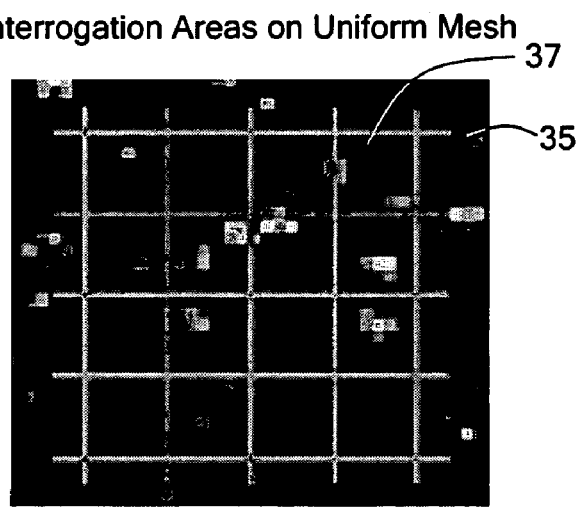
Figure 9C:
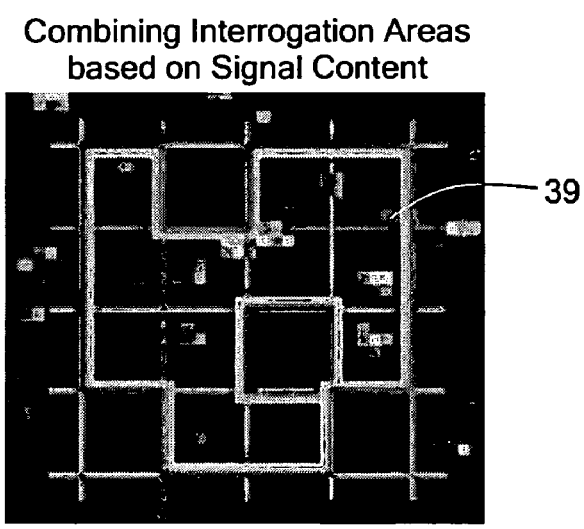

Referring to FIGS. 9a, 9b, and 9c, the method 100 (FIG. 1b) of reverse hierarchical processing of the present invention provides a method of selectively combining correlation planes, interrogation areas or image regions of sub-image blocks based on their signal content. More specifically, in FIG. 9a, an exemplary original image frame is shown having a uniform mesh 35. In FIG. 9b a number of interrogation areas 37 are defined on the uniform mesh 35 of the original image frame of FIG. 9a. In FIG. 9c, a combined correlation plane or image region 39 is shown. The combined correlation plane or image region 39 is formed by selectively combining or summing interrogation areas 37 based on their signal content.

Figure 10:
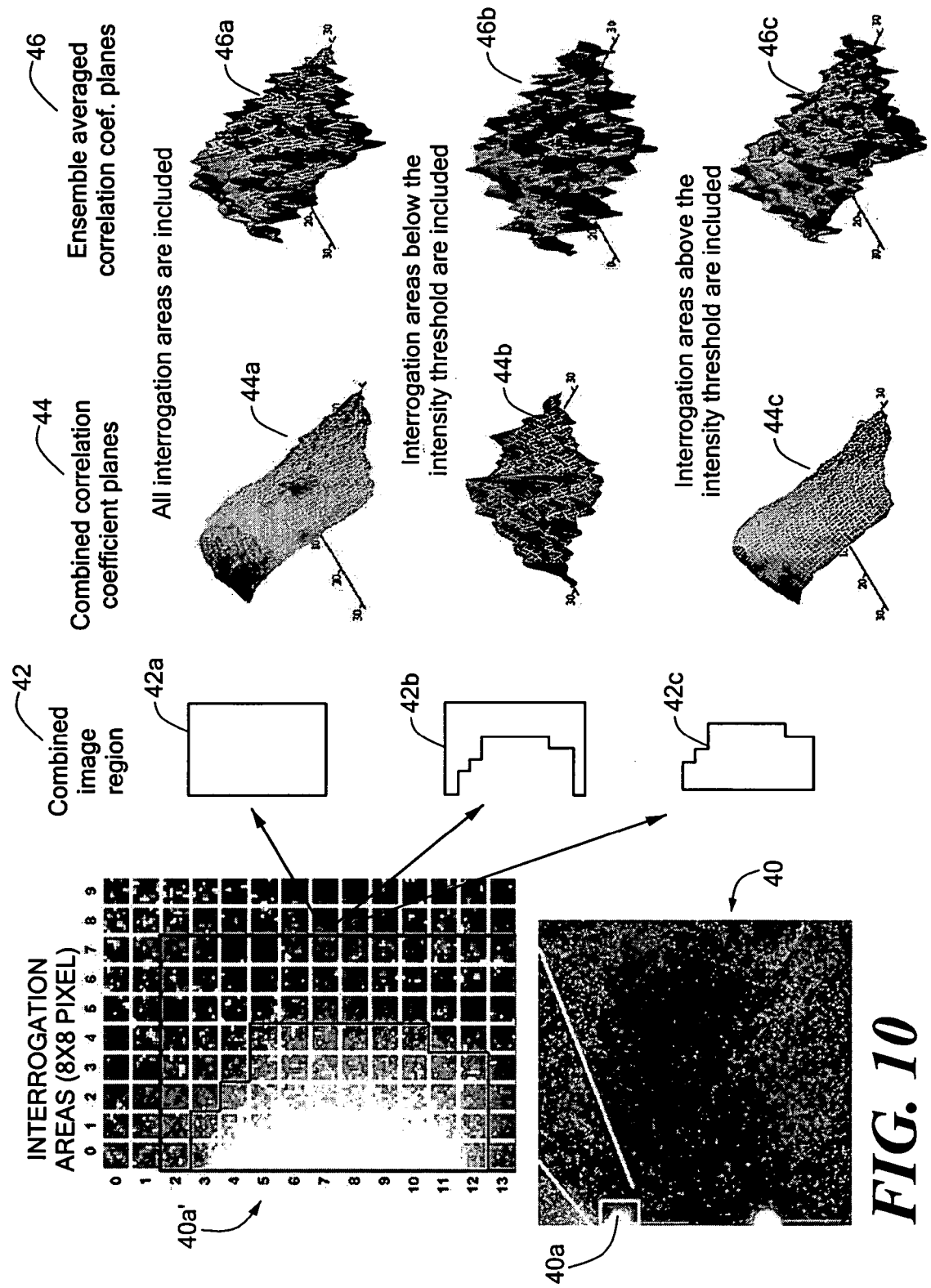
FIG. 10 shows correlation planes which can be combined based on the signal content of the interrogation areas that can reduce the influence of noisy sub-image regions, like the shiny reflection spots depicted, and also demonstrates the difference between ensemble averaging and correct combination of cross-correlation coefficient planes using the equations in Table 1.

Referring to FIG. 10, shown is an expanded view 40a' of an interrogation area 40a of an exemplary seeded fluid flow image 40. The expanded view 40a' of the interrogation area 40a, as described above, can be segmented into a number of image regions, 42a, 42b, 42c, as shown in the combined image region column 42. Further, correlation coefficient planes 44a, 44b, 44c can be respectively calculated using the CBC process for each of the corresponding image regions, 42a, 42b, 42c, which are depicted under the combined correlation coefficient planes column 44. Additionally, ensemble averaged correlation coefficient planes 46a, 46b, 46c, can also be respectively calculated for each of the corresponding image regions, 42a, 42b, 42c, which are depicted under the ensemble averaged correlation coefficient planes column 46.

The combined correlation plane or image regions principle is particularly useful in resolving particle or object displacement in images with relatively large pixel disparities, as exemplified by the interrogation area 40a' of the fluid flow image 40, which results from dense and sparse seeding. Further, the combined correlation plane or image region principle is also advantageous in improving signal-to-noise ratio in the combined correlation plane or image region, and can also be applied to edges, curved surfaces or shiny walls or reflection spots.

In order to take full advantage of this selective combination of correlation planes, the investigated fluid flow region should be investigated by using relatively fine interrogation area sizes, which are used to calculate the correlation planes whose mean intensity is above (and/or below) a threshold intensity separating histograms of noise and signal. Thereafter, the correlation planes of interrogation areas with relatively high signal content are used in stepping up in the spatial scale hierarchy. With the help of such selective combination, individual particle locations can be relatively easily identified and the signal-to-noise ratio can be improved, even in sparsely seeded regions.

Figure 11A:
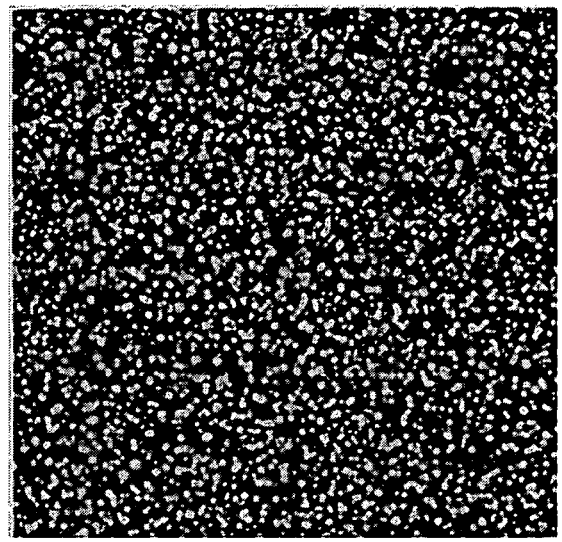
FIGS. 11a, 11b, 11c, 11d shows an exemplary result of using the method of reverse hierarchical processing of the present invention on a sample VSJ Standard Image No. 23, 3D Jet Impingement/Dense Particle.
Figure 11B:
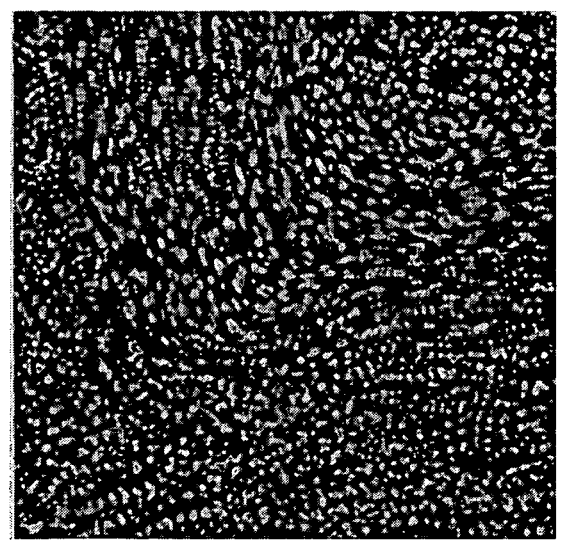
Figure 11C:
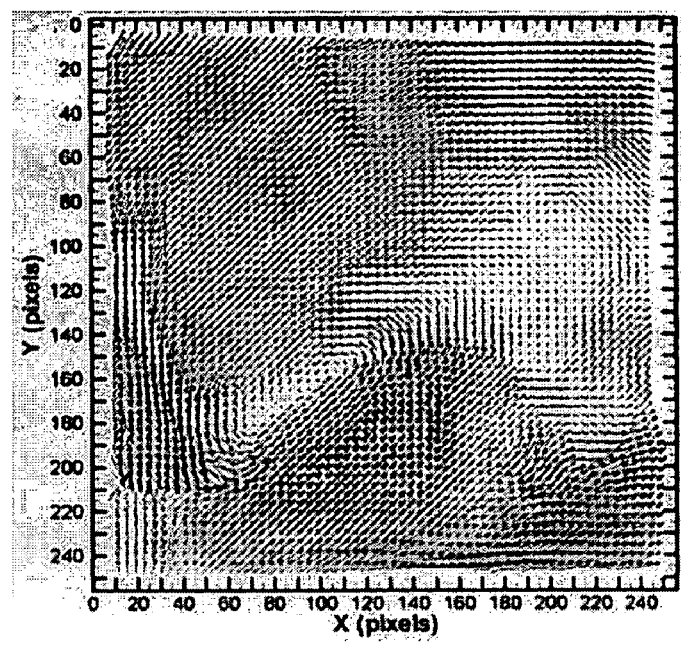
Figure 11D:
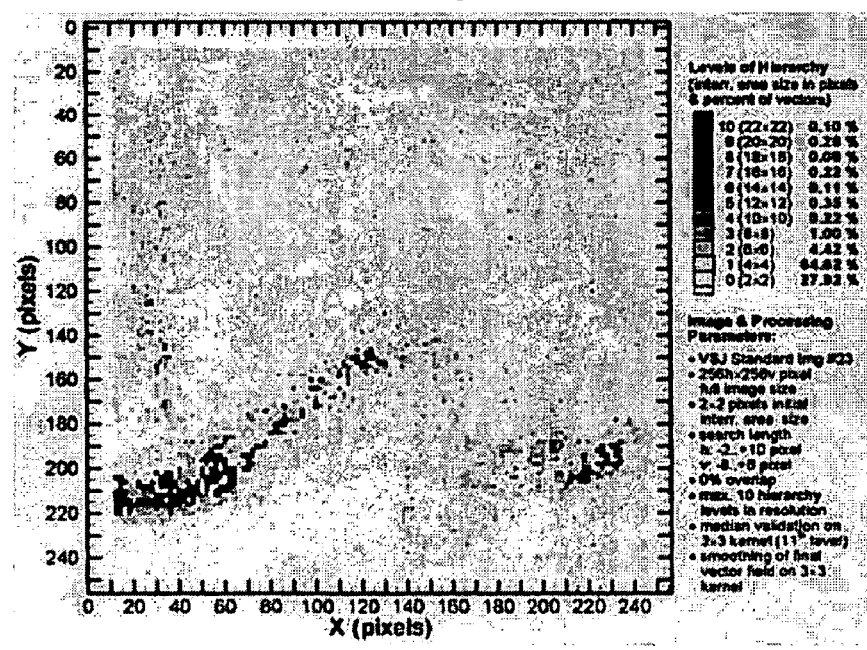
Figure 12A:
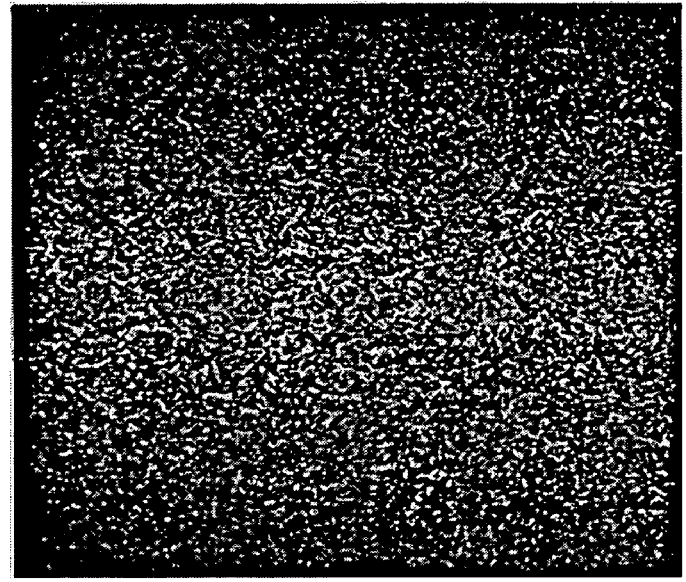
FIGS. 12a, 12b, 12c, 12d shows an exemplary result of using the method of reverse hierarchical processing of the present invention on a sample high Reynolds number swirling flow.
Figure 12B:
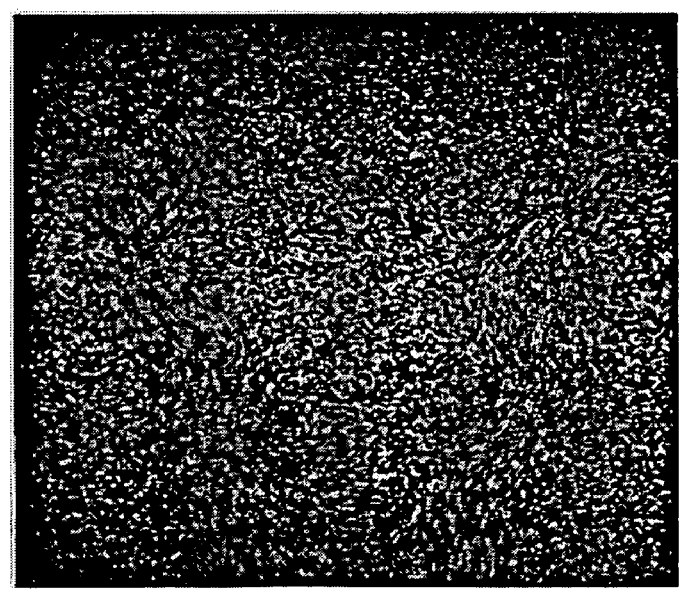
Figure 12C:
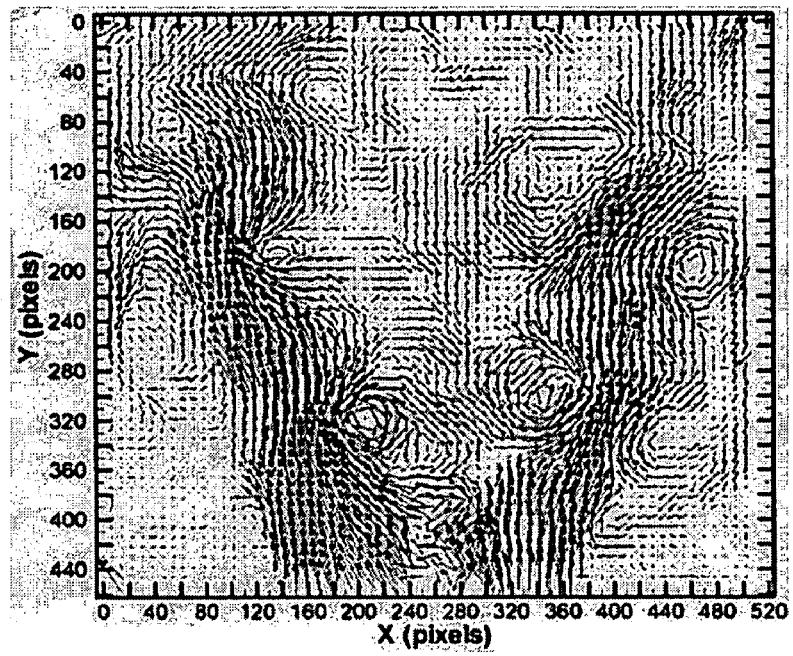
Figure 12D:
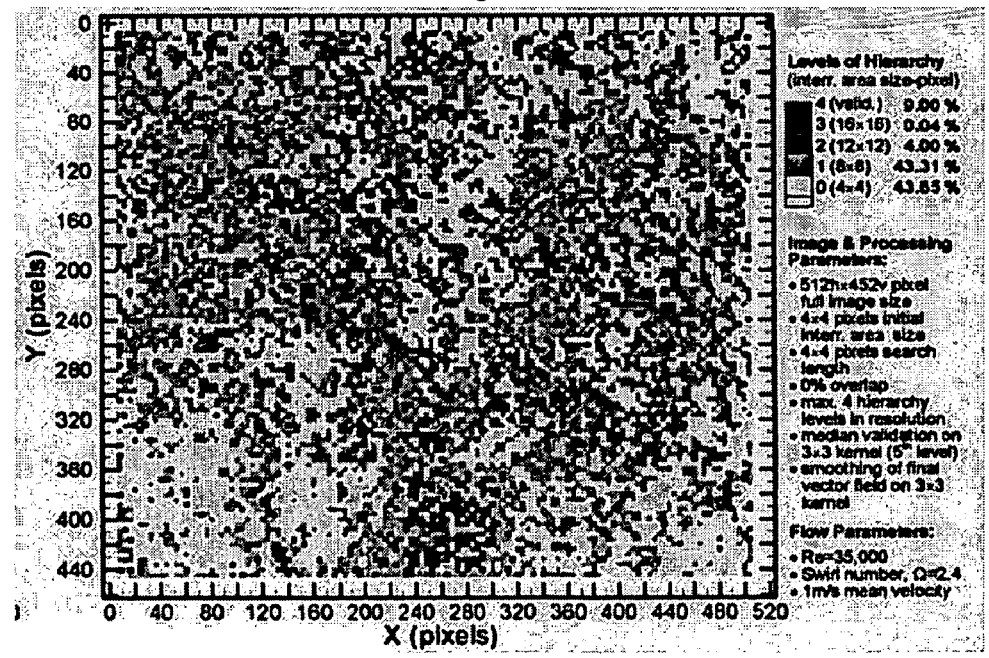

FIGS. 11a, 11b, 11c and 11d (collectively referred to as FIG. 11) show an exemplary application of the method 100 (FIG. 1b) of reverse hierarchical processing on a VSJ PIV Standard Image No. 23: 3D Jet Impingement/Dense Particle, which can be obtained from As can be seen in FIG. 11d, 27.92% of the vectors were identified at the smallest evaluated scale of 2×2 pixels and 64.62% of the vectors were successfully identified at the second processing level relevant to 4×4 pixel interrogation area sizes. These two levels cover 92.54% of the evaluated cases. Taking the seeding number density into account, the first 2×2 pixel level includes those interrogation areas where particle image signal is present, and the second level with 4×4 pixel resolution includes those of the first level where particle image was entirely missing or its intensity was low. These estimated displacements are not independent due to oversampling, and this result shows the robustness of the method 100 (FIG. 1b) of the present invention. However, it will be appreciated that a small fraction of particle images with a 7 pixel diameter can provide valid detections. This capability of the processing suggests that recovered velocity fields should be carefully examined in order to take oversampling into account based on local seeding conditions. Larger interrogation area sizes were necessary at the bottom left corner due to larger displacement variation that resulted in the failure of CBC because the two CBC correlation peaks were too far apart.

FIGS. 12a, 12b, 12c, 12d (collectively referred to as FIG. 12) show an exemplary image pair of a high Reynolds (e.g., a non-dimension number in fluid dynamics representing whether a fluid flow is laminar, turbulent or swirling). As shown in FIG. 12, minimal features of the fluid flow are depicted due to the homogeneous seeding density that is required to obtain a high valid detection rate of displacements over the majority of the investigated fluid flow field. On the other hand, the strong illumination variation presents some imaging anomalies for the processing. This same image pair was also processed using the forward hierarchical processing scheme, as described above with respect to Hart D P (2000) PIV error correction, with a 64×64 pixel starting interrogation area size and five hierarchy-levels of spatial scales. This computational load represents a significant difference compared to the method 100 (FIG. 1b) of reverse hierarchical processing of the present invention, which is capable of resolving 86.96% of the vectors in two steps. It is interesting to see that the distribution of the final interrogation area size that gave successful CBC validation slightly resembles the shape of the 2-D image of the swirling jet. This shows that the method 100 (FIG. 1b) of reverse hierarchical processing of the present invention adapts itself to local flow and imaging conditions.

There are a number of advantages to the inventive method of reverse hierarchical processing of the present invention, which includes providing a method for determining the relative displacement of particles, pixels, objects and/or portions of an image with high resolution and dynamic range. A reformulation of computing the correlation, cross-covariance, and cross-correlation coefficient field of sub-image areas results in a multi-resolution fine-to-coarse processing method (e.g., reverse hierarchical processing).

Furthermore, the inventive method of reverse hierarchical processing can be implemented on fluid flow images and starts at the smallest scale and locally builds up correlation planes relevant to larger interrogation area sizes if a valid signal peak is not found at the smaller scale. A multi-stage signal peak searching and validation algorithm, as provided by Hart D P (2000) PIV error correction, can be used in conjunction with the method 100 for efficiently guiding the processing between the levels of the spatial scale hierarchy 16 (FIG. 1b).

The inventive method of multi-resolution adaptive correlation processing also provides that the combination of correlation planes, for example, can be accomplished in an efficient manner using ensemble averaging of the relevant parameters. This technique can also be used to combine correlations efficiently in time leading to ultra high spatial resolution statistical flow parameter estimations. The method 100 (FIG. 1b) of the present invention also permits selective combination of correlation planes both in space and in time essentially on any shape to enhance signal-to-noise ratio or, more specifically, to eliminate noisy image regions, or select and group relevant image features (e.g. phase locking temporal signal).

The inventive method of reverse hierarchical processing fluid flow images was demonstrated on one synthetic PIV image (FIG. 11) and two real images (FIGS. 12, 13) involving large velocity gradients, densely and sparsely seeded flow regions, and strong illumination variation. In the exemplary demonstrations of the method 100 (FIG. 1b) of reverse hierarchical processing, as operated on the fluid flow images in FIGS. 11, 12, 13, the method successfully adapted interrogation area size to local flow and imaging conditions. Further, in approximately 50-80% of the evaluated vectors, the real signal peak was identified either at the first or at the second smallest scale level (e.g., Level-0 or Level-1) of the spatial scale hierarchy 16 (FIG. 1), which represents significant computational savings compared to ordinary hierarchical algorithms.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of processing at least first and second images of an image flow of an object to determine a relative displacement map of elements of the image flow over a predetermined time interval, the method comprising:

recording a first array of pixel values associated with the first image of the image flow;

recording a second array of pixel values associated with the second image of the image flow;

defining a first plurality of interrogation regions on the first array of pixel values, each of the first plurality of interrogation regions including a first number of pixels indicative of a first resolution at which to correlate the first and second images;

determining a first correlation plane formed from correlations between each of the first plurality of interrogation regions and at least one associated region in the second array of pixel values, the first correlation plane including a maximum correlation value for each of the first plurality of interrogation regions indicating which of the at least one associated regions each of the first plurality of interrogation regions are most highly correlated with;

determining a direction and magnitude associated with each of the maximum correlation values which represents the relative displacement between each of the first interrogation regions and the respective most highly correlated associated region in the second array of pixels over the predetermined time interval;

for each of the determined directions and magnitudes that are resolved, adding each resolved direction and magnitude to the displacement map at a location associated with the respective first interrogation region;

for each of the determined directions and magnitudes that are unresolved, expanding the associated first interrogation region to form a second plurality of interrogation regions, each of the second plurality of interrogation regions having a second number of pixels, greater than the first number of pixels, indicative of a second resolution at which to correlate the first and second images and determining a second correlation plane formed from correlations between each of the second plurality of interrogation regions and one or more associated regions in the second array of pixel values, the second correlation plane including a maximum correlation value for each of the second plurality of interrogation regions indicating which of the at least one associated regions each of the second plurality of interrogation regions are most highly correlated with, and determining a direction and magnitude associated with each of the maximum correlation values which represents the relative displacement between each of the second interrogation regions and the respective most highly correlated associated region in the second array of pixels over the predetermined time interval; and for each of the determined directions and magnitudes that are resolved, adding each resolved direction and magnitude to the displacement map at a location associated with the respective second interrogation region.

2. The method of claim 1, wherein for each of the determined directions and magnitudes that are unresolved, the method further includes:

expanding the associated second interrogation region to form a third plurality of interrogation regions, each of the third plurality of interrogation regions having a third number of pixels, greater than the second number of pixels, indicative of a third resolution at which to correlate the first and second images.

3. The method of claim 2, further including:

determining a third correlation plane formed from correlations between each of the third plurality of interrogation regions and one or more associated regions in the second array of pixel values, the third correlation plane including a maximum correlation value for each of the third plurality of interrogation regions indicating which of the at least one associated regions each of the third plurality of interrogation regions are most highly correlated with.

4. The method of claim 3, further including:

determining a direction and magnitude associated with each of the maximum correlation values which represents the relative displacement between each of the third interrogation regions and the respective most highly correlated associated region in the second array of pixels over the predetermined time interval.

5. The method of claim 1, wherein expanding the plurality of interrogations regions includes doubling the number of pixels that form each of the plurality of interrogation regions.

6. The method of claim 1, wherein determining the second correlation plane includes combining corresponding portions of the first correlation plane.

7. The method of claim 3, wherein determining the third correlation plane includes combining corresponding portions of the second correlation plane.

8. The method of claim 1, wherein expanding the associated first interrogation regions includes grouping at least two interrogation regions of the first plurality of interrogation regions to form one of the second plurality of interrogation regions.

9. The method according to claim 2, wherein expanding the associated first interrogation regions includes grouping at least two interrogation regions of the second plurality of interrogation regions to form one of the third plurality of interrogation regions.

* * * * *